Nov. 8, 1949
A. W. MILLS ET AL
2,487,357
RECORD CONTROLLED TICKET PRINTING MACHINE
Filed Nov. 6, 1946
15 Sheets-Sheet 4
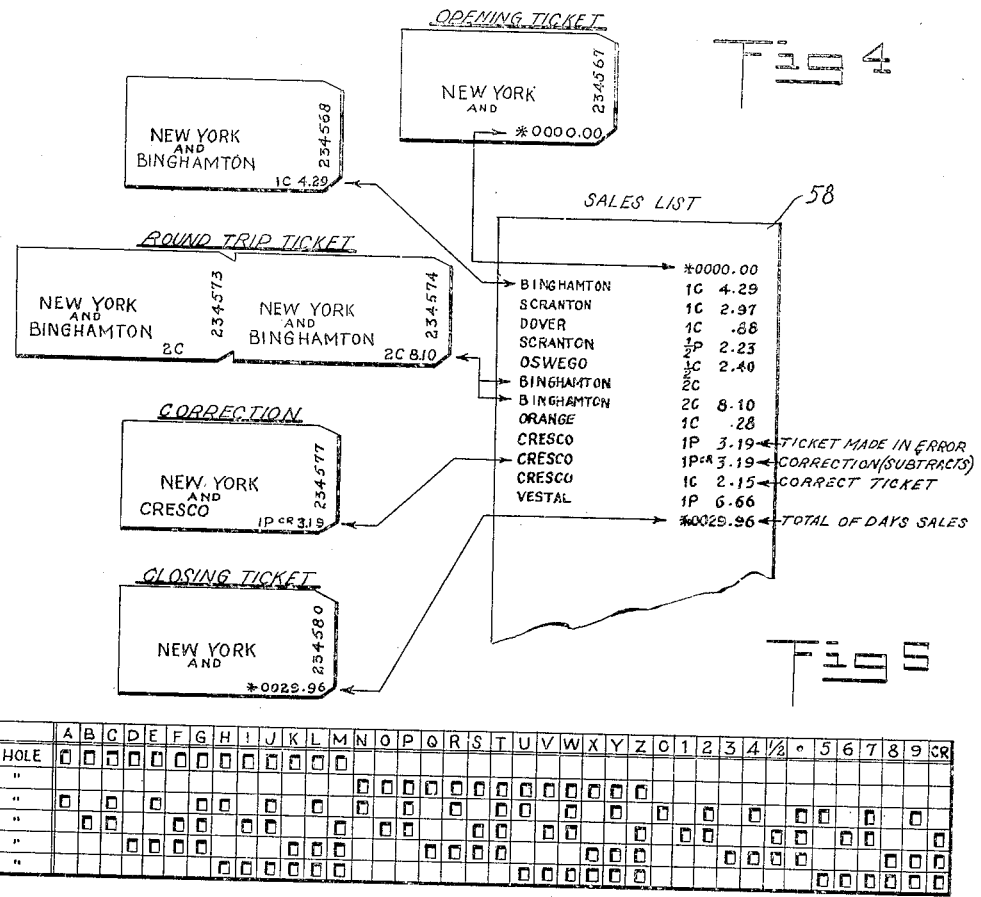
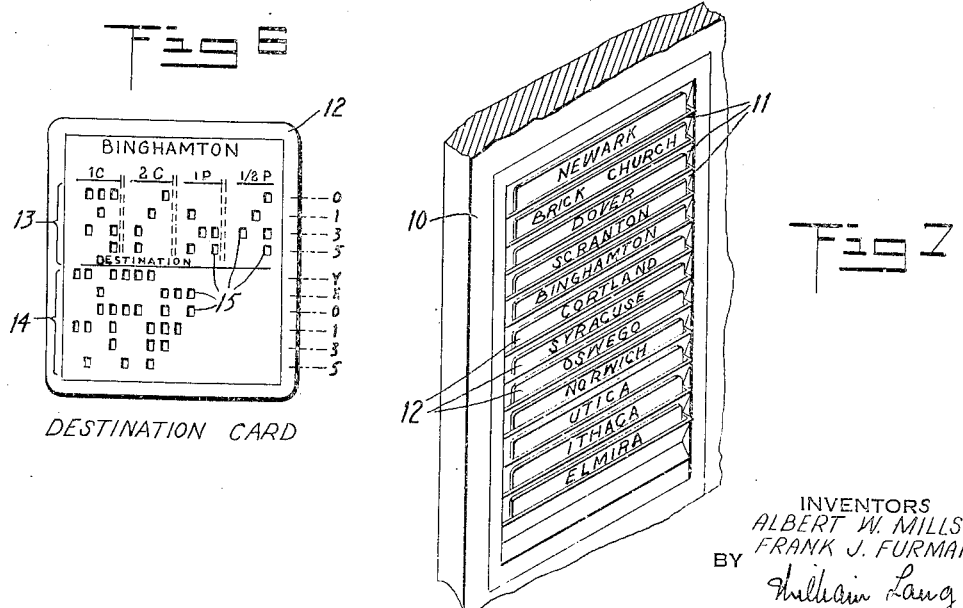
INVENTORS
ALBERT W. MILLS
FRANK J. FURMAN
BY
William Lang
ATTORNEY

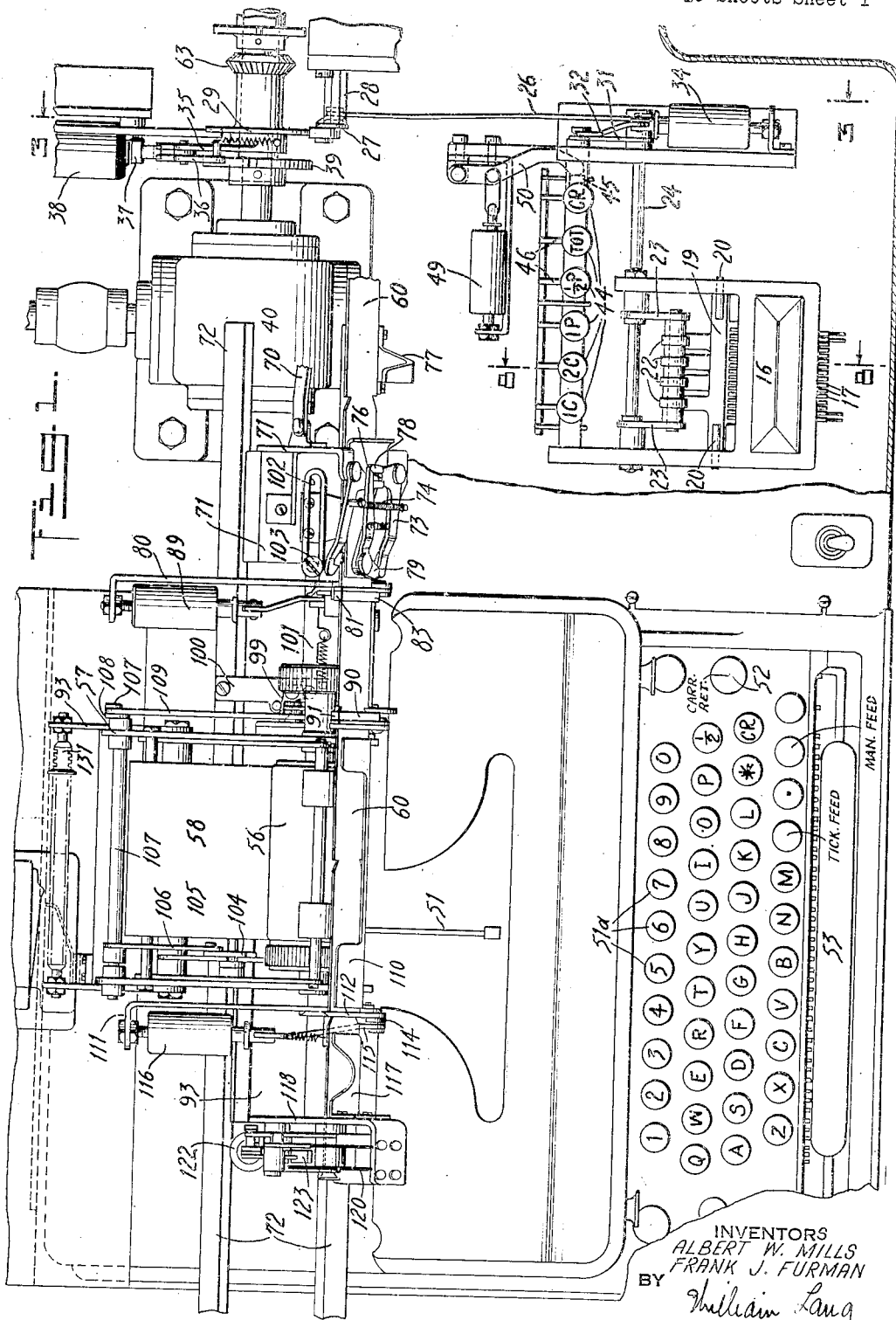

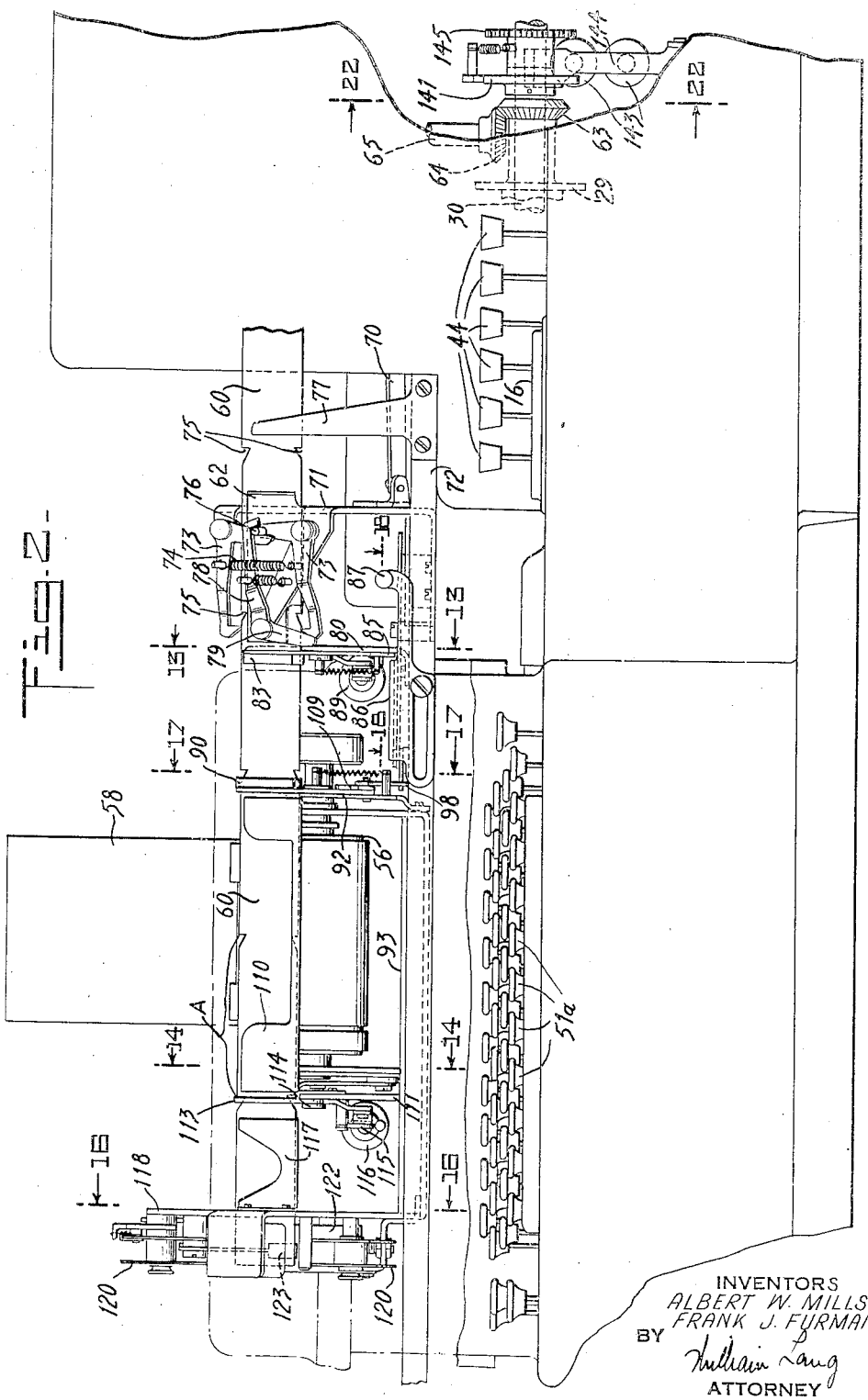

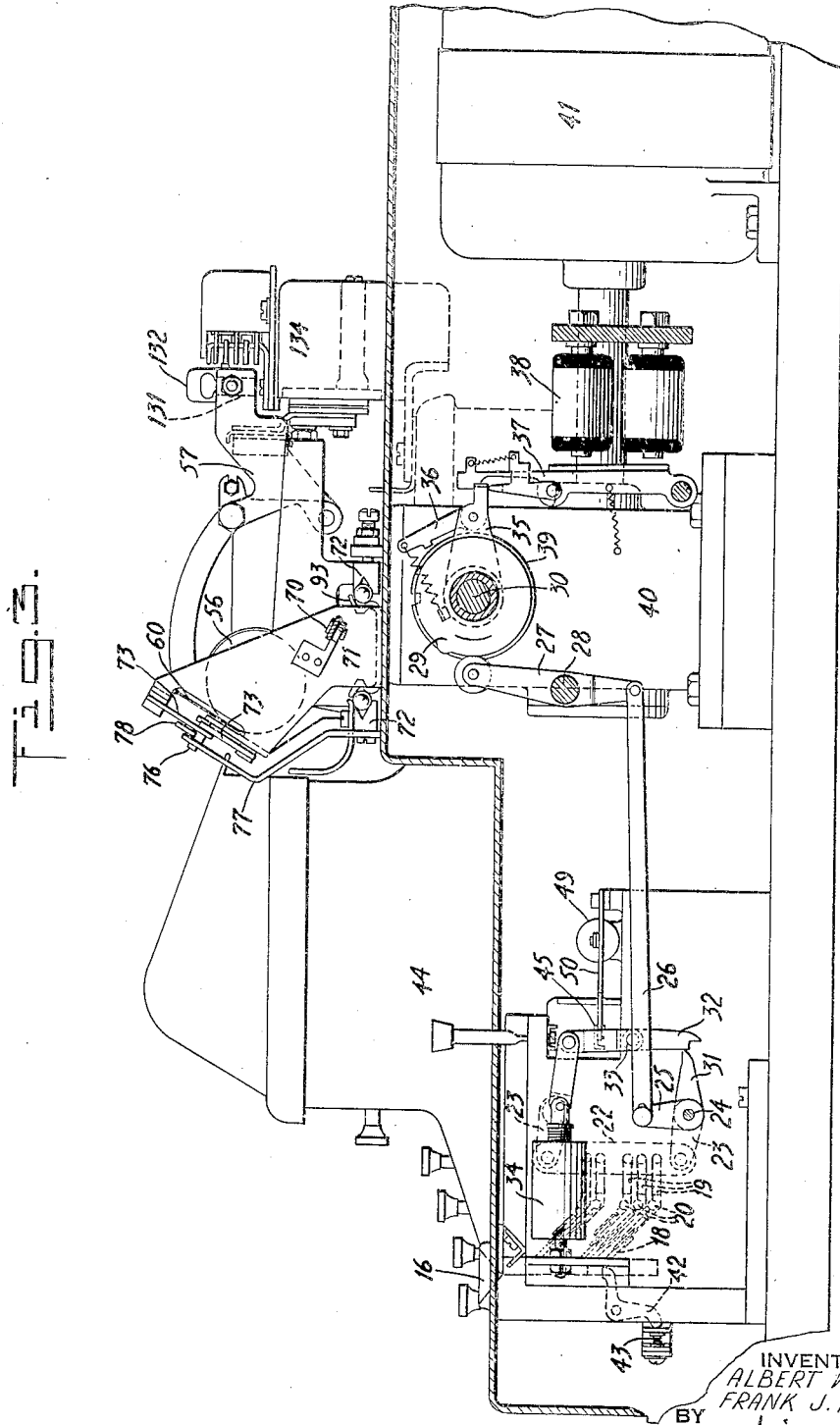

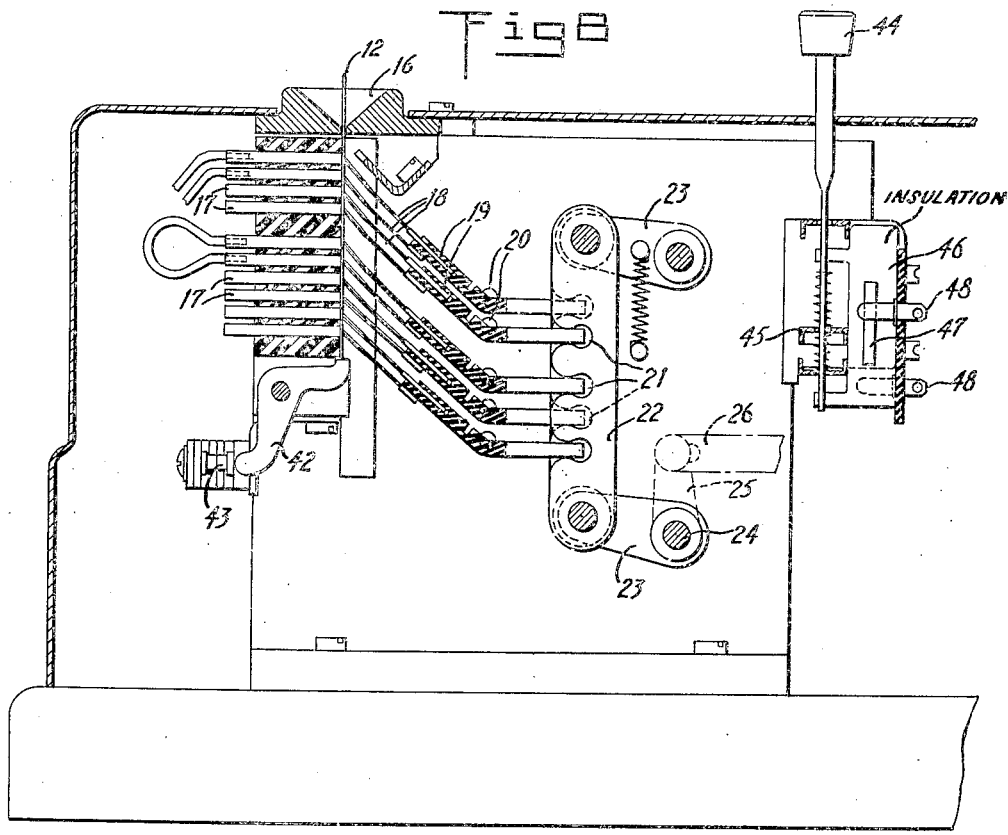
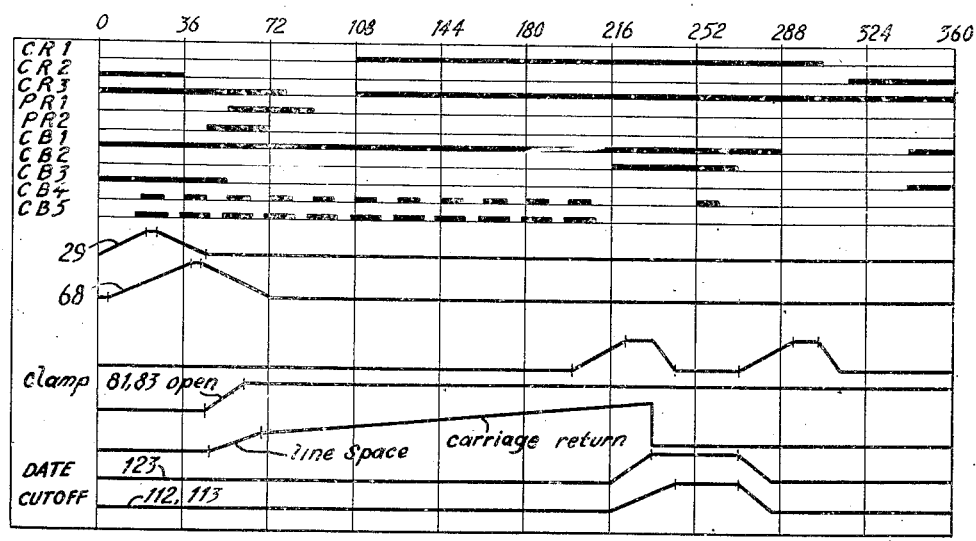

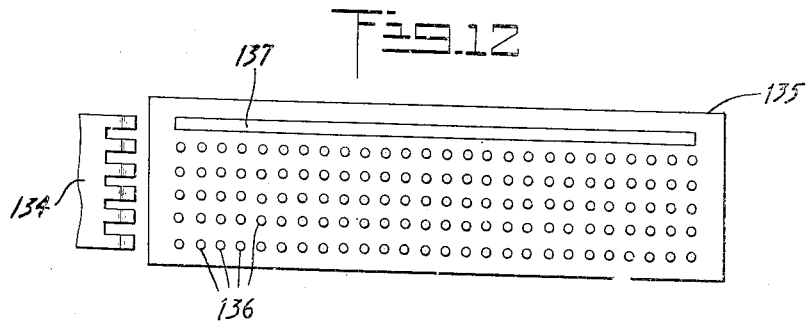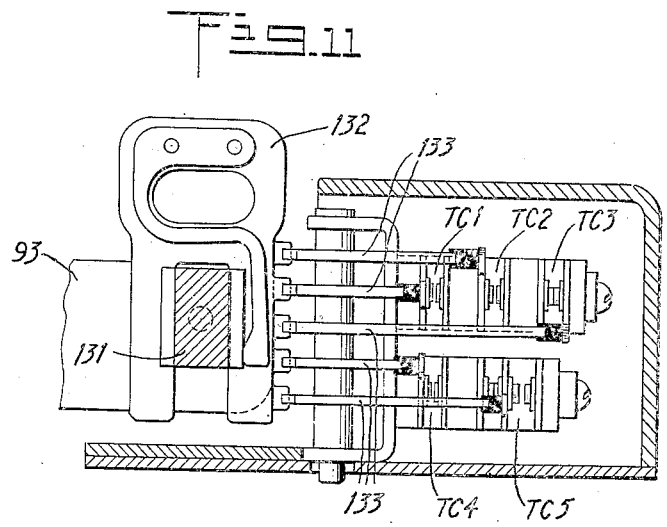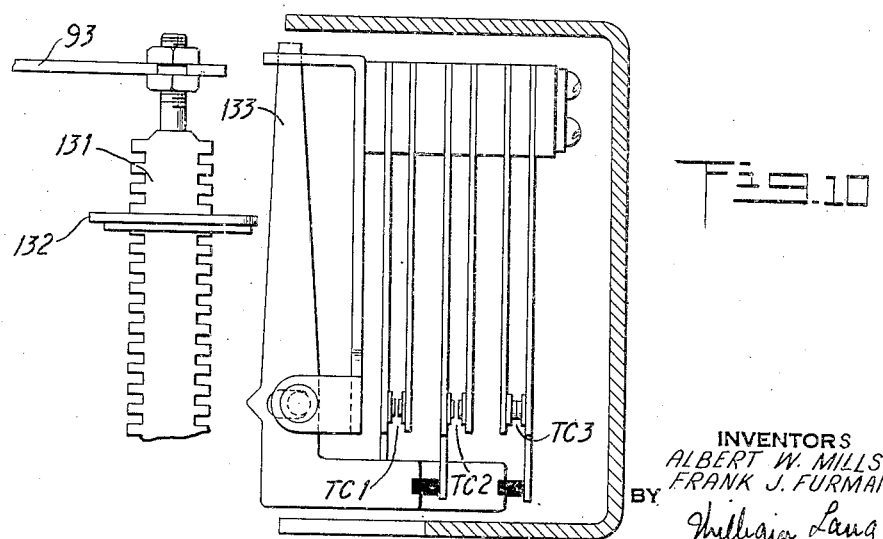

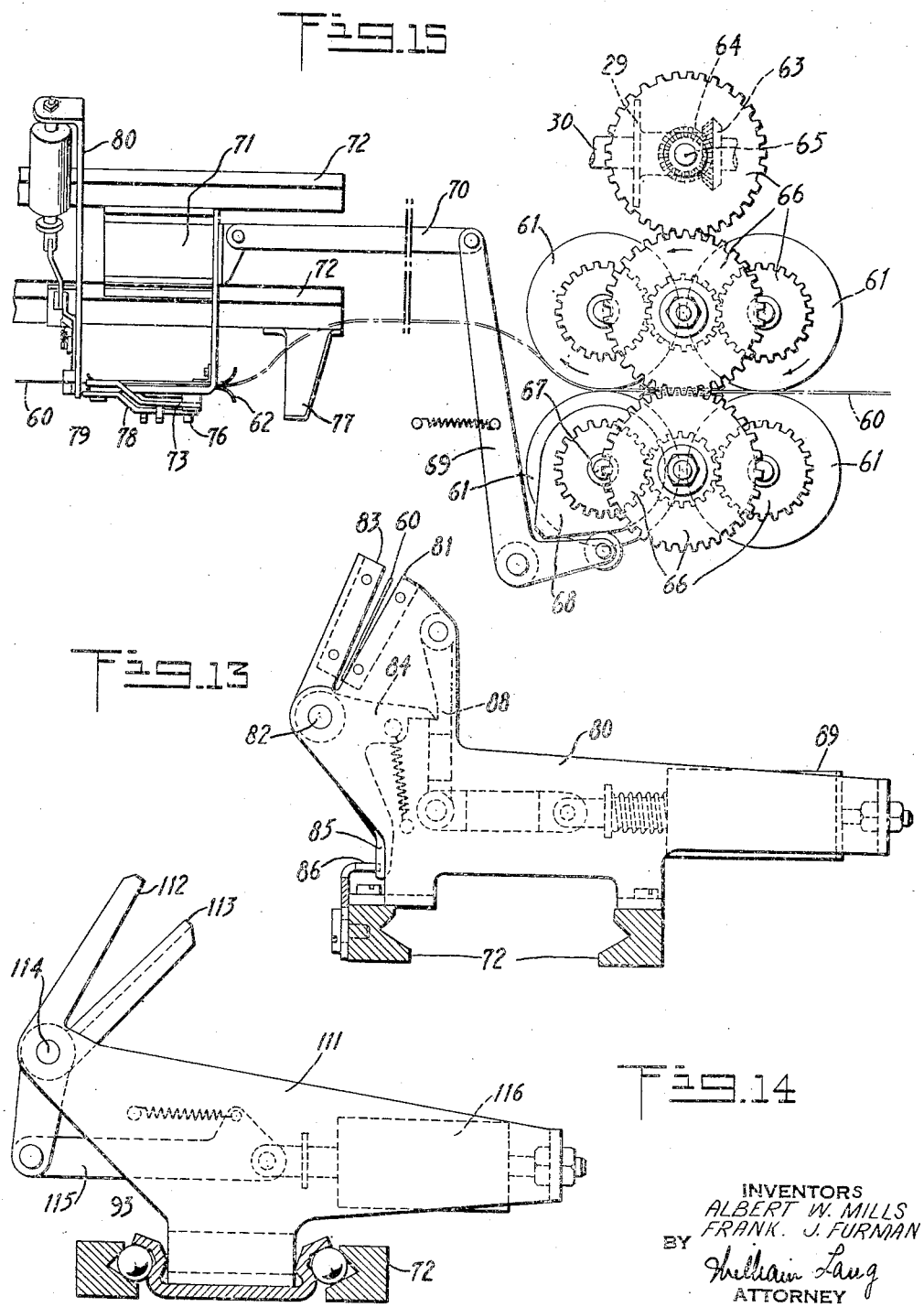

Nov. 8, 1949 A. W. MILLS ET AL 2,487,357
RECORD CONTROLLED TICKET PRINTING MACHINE
Filed Nov. 6, 1946 15 Sheets-Sheet 8
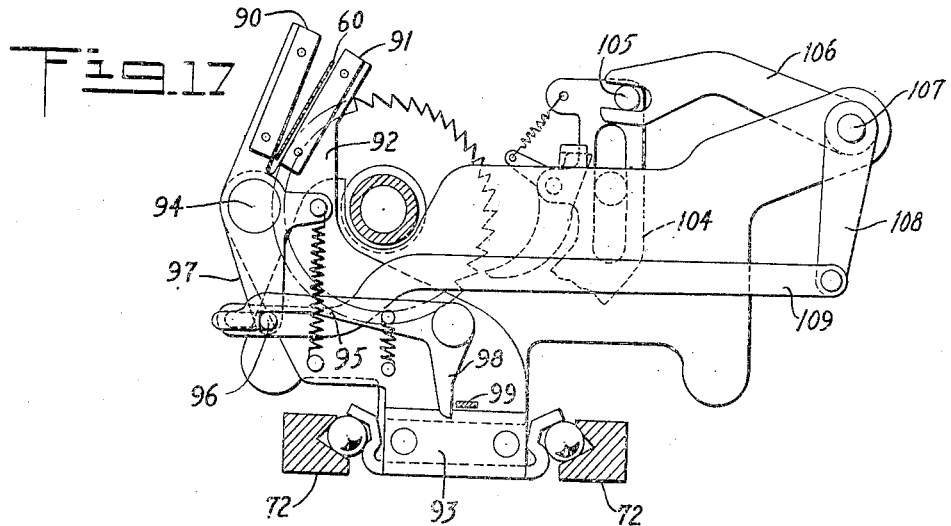
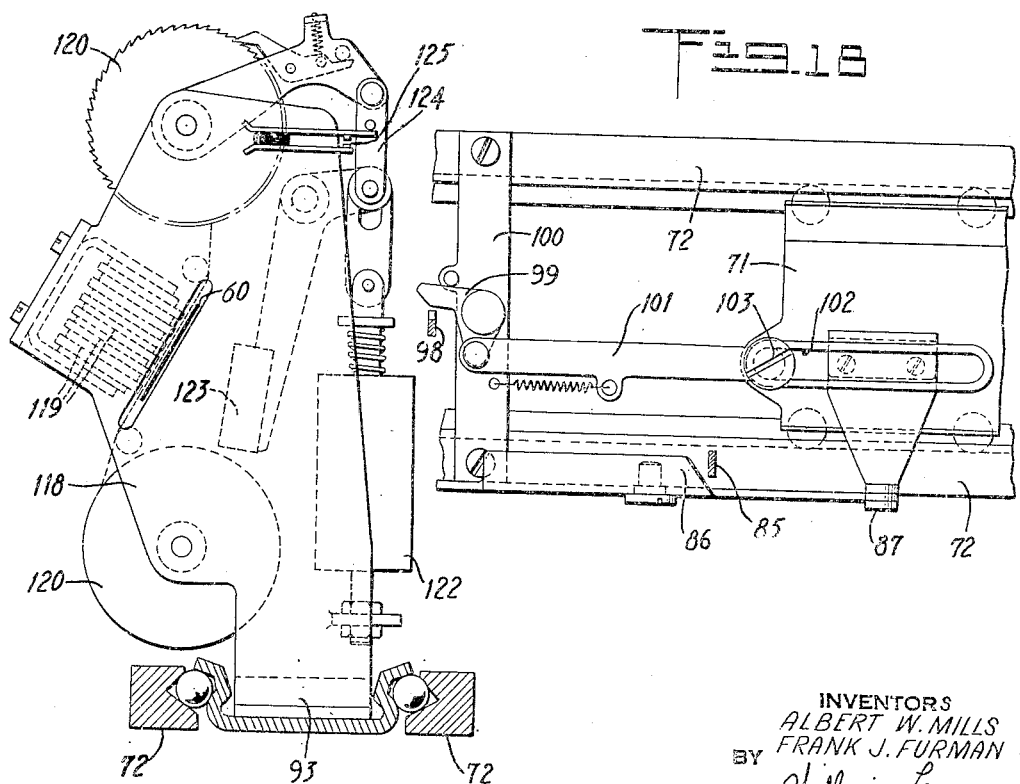
INVENTORS
ALBERT W. MILLS
FRANK J. FURMAN
BY
William Lang
ATTORNEY

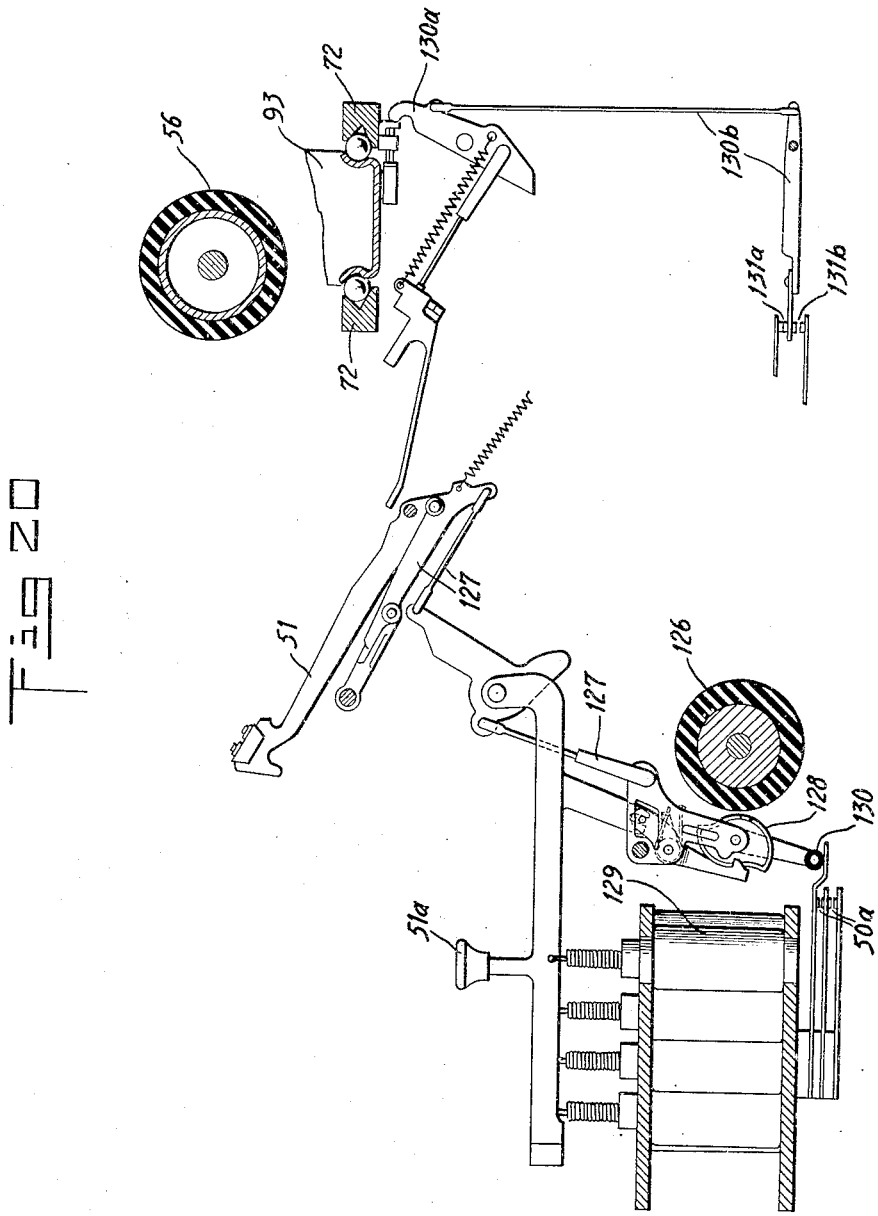

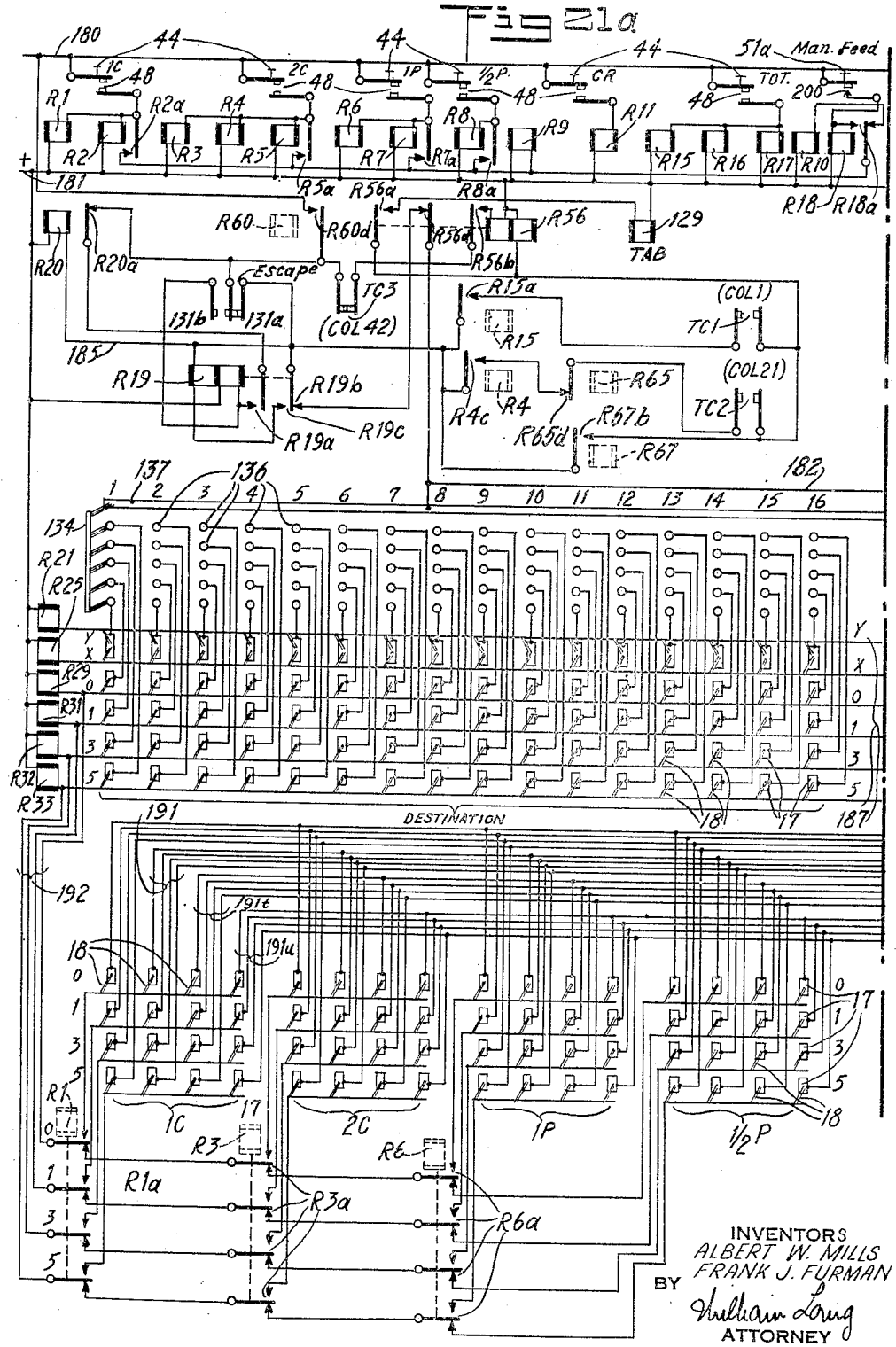

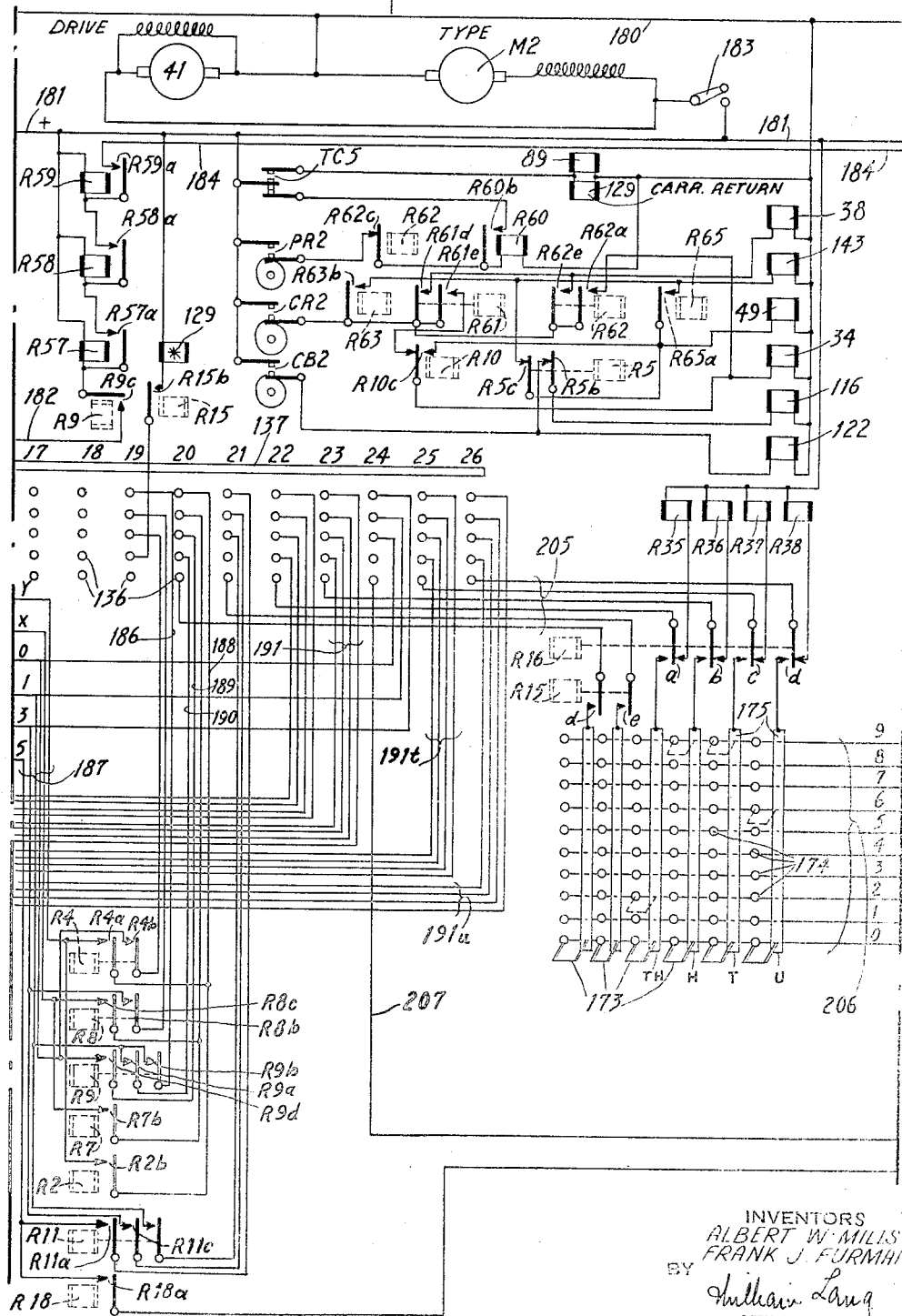

Nov. 8, 1949  A. W. MILLS ET AL  2,487,357
RECORD CONTROLLED TICKET PRINTING MACHINE
Filed Nov. 6, 1946   15 Sheets-Sheet 13

INVENTORS
ALBERT W. MILLS
FRANK J. FURMAN
BY
William Lang
ATTORNEY

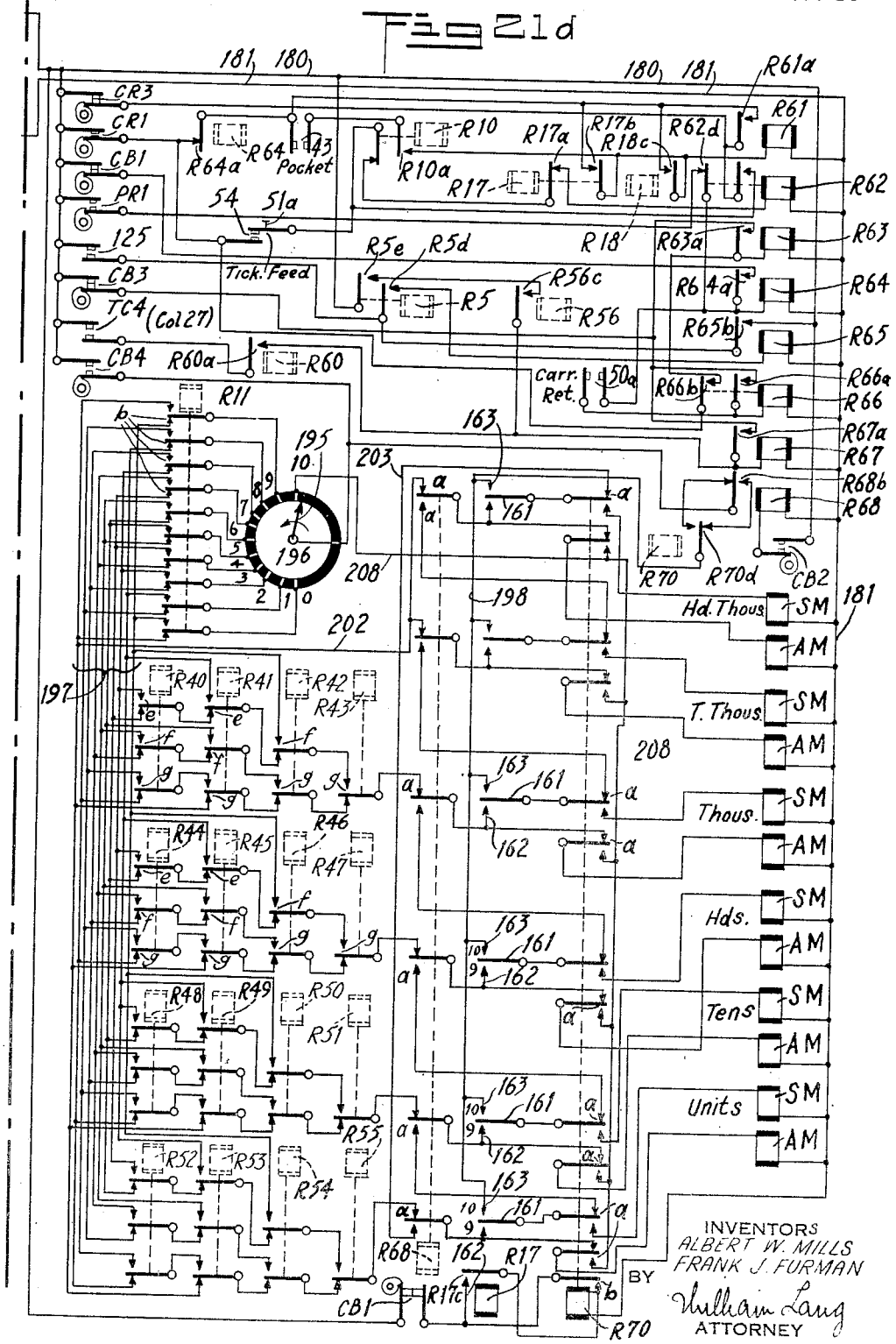

Nov. 8, 1949     A. W. MILLS ET AL     2,487,357
RECORD CONTROLLED TICKET PRINTING MACHINE
Filed Nov. 6, 1946     15 Sheets-Sheet 15
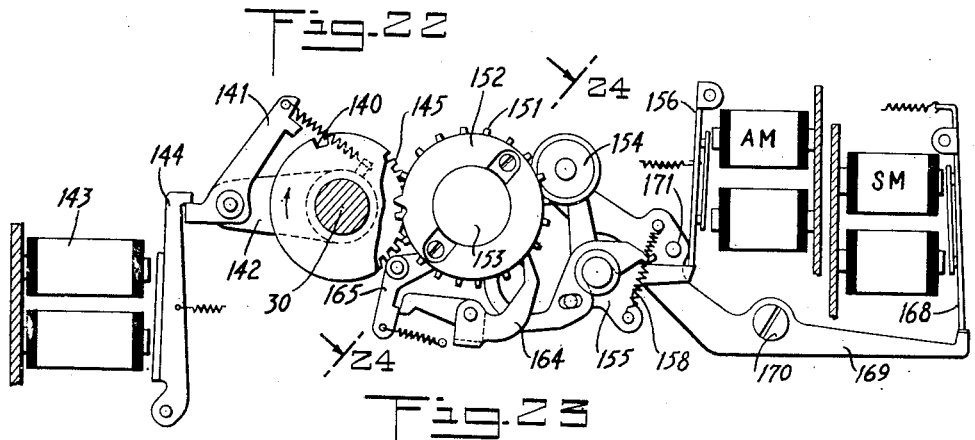
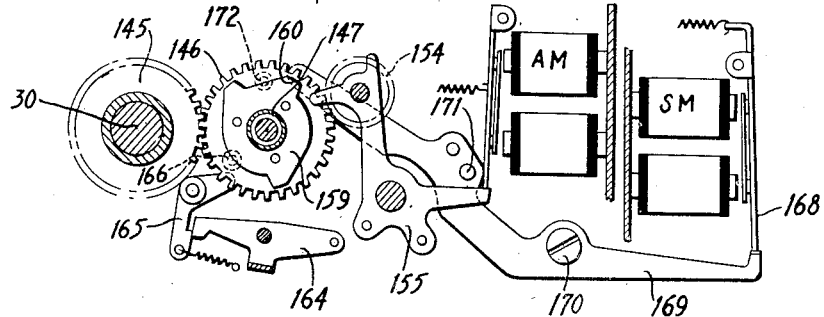
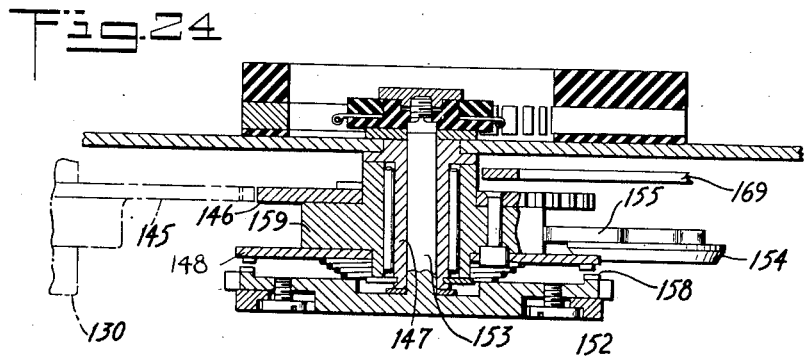
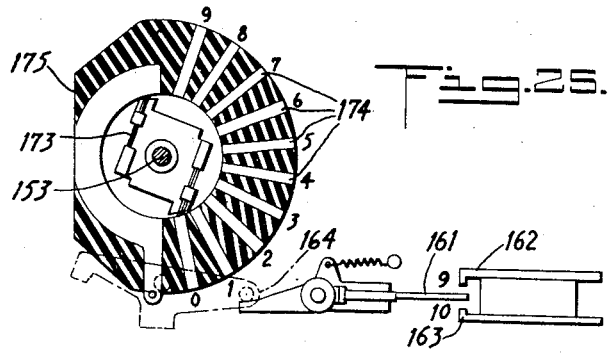
INVENTORS
ALBERT W. MILLS
FRANK J. FURMAN
BY
William Lang
ATTORNEY Patented Nov. 8, 1949

2,487,357

UNITED STATES PATENT OFFICE 2,487,357

RECORD CONTROLLED TICKET PRINTING MACHINE

Albert W. Mills and Frank J. Furman, Endicott, N. Y., assignors to International Business Machines Corporation, New York, N. Y., a corporation of New York Application November 6, 1946, Serial No. 708,102

8 Claims. (Cl. 197—20)

This invention relates to printing machines and more particularly to a machine for printing railroad tickets containing variable data such as destination, fare, class of ticket, etc.

The principal object of the invention is to provide a simplified ticket issuing machine controlled by any one of a file of control cards containing designations indicating the class of ticket to be issued, the fare, and the destination.

In carrying out the objects of the invention, a continuous strip of material having the width of the tickets to be issued is threaded through the machine adjacent the printing platen of a typewriter which constitutes the apparatus for printing data on the tickets. The operator selects from a suitable file a control or destination card containing designations representing a destination and further designations representing a plurality of different fares for different classification. This card is inserted in a reading or control station and a classification key is then operated to select an appropriate set of fare data.

Operation of this key will initiate the automatic issuance of a ticket which includes first aligning the ticket tape into proper register with the typewriter carriage and clamping it thereto, then automatically typing the destination under control of the card, the class of ticket under control of the key, and then the corresponding fare under control of the card. Upon completion of these operations, the ticket is automatically dated and cut off.

Provision is made to enter the fare into an accumulating mechanism which maintains a cumulative total of all tickets issued. Where a round trip or two-way ticket is desired, an appropriate key is operated which causes two tickets to be issued in a continuous strip with the destination and class printed on both tickets and the fare on one of them followed by a cutoff operation, leaving the two parts joined together.

A specific object of the invention is to provide simple control mechanism for effecting the foregoing operations of ticket issuing in a rapid manner.

A further object is to provide an apparatus whereby the destination and fare may be typed manually where no control card is available for a particular destination.

A still further object is to provide novel automatic spacing devices to automatically space over variable positions of the ticket as required by destinations of different length names.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view of the apparatus showing the location of the destination card reading unit and the ticket printing mechanism.

Fig. 2 is a front elevation of the apparatus.

Fig. 3 is a side elevation of the apparatus looking in the direction of lines 3—3 of Fig. 1.

Fig. 4 is a diagram showing the relationship between the several types of tickets and the manner in which they are recorded on a sales list.

Fig. 5 is a chart showing the perforating code.

Fig. 6 shows one of the control or destination cards.

Fig. 7 shows a rack in which the different destination cards are filed.

Fig. 8 is a sectional elevation through the destination card reading unit taken on lines 8—8 of Fig. 1.

Fig. 9 is a timing chart of several of the mechanical and electrical devices of the apparatus.

Figs. 10 and 11 are details of the so-called tab contact operating devices.

Fig. 12 is a detail of a column selector associated with the printing device.

Fig. 13 is a section taken on lines 13—13 of Fig. 2, showing the stationary ticket clamp.

Fig. 14 is a section taken on lines 14—14 of Fig. 2 showing the ticket cutoff shears.

Fig. 15 is a detail of the ticket aligning mechanism.

Fig. 16 is a section on lines 16—16 of Fig. 2 showing the date printing mechanism.

Fig. 17 is a section taken on lines 17—17 of Fig. 2 showing the ticket feed clamp.

Fig. 18 is a detail of parts looking in the direction of lines 18—18 of Fig. 2.

Fig. 20 is a view showing the essential elements of the printing mechanism.

Figure 19:
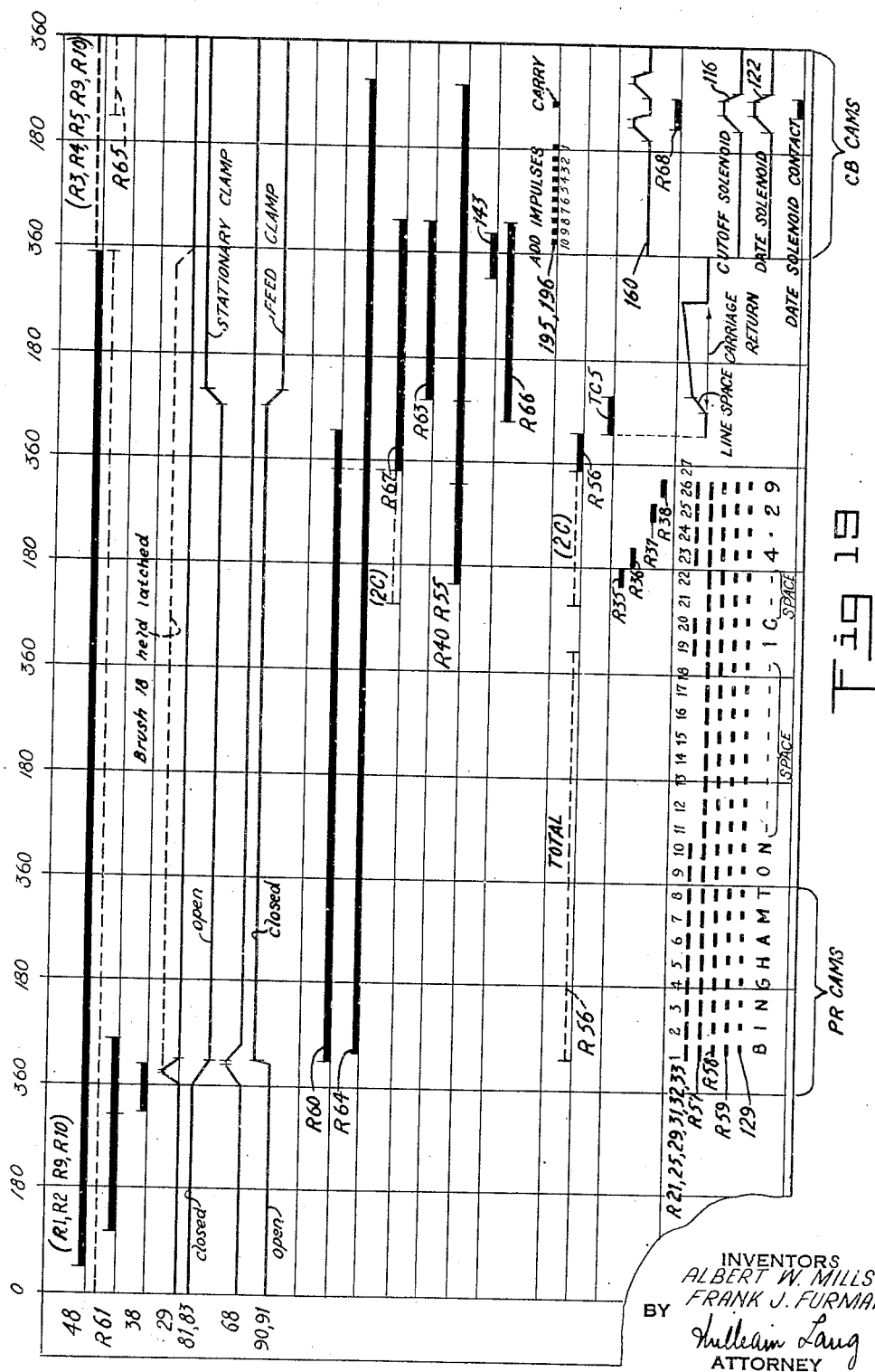
Fig. 19 is a sequence chart showing the several successive operations involved in the preparation of a ticket.

Figs. 21a, 21b, 21c and 21d taken together and arranged horizontally in the order named constitute a wiring diagram of the electrical circuits of the apparatus.

Fig. 22 is a view showing the essential operating elements of one denominational order section of the accumulator.

Fig. 23 is a section through the accumulator showing the interior construction.

Fig. 24 is a section taken along lines 24—24 of Fig. 22.

Fig. 25 is a detail of the total readout device of the accumulator.

The destination cards

In Fig. 7 is shown a rack 10 provided with suitable overlapped chutes for receiving the destination cards 12, one of which is shown in Fig. 6. Each card is divided into an upper field 13 and a lower field 14 in which data perforations 15 are made. Perforations in the lower field represent the destination printed at the top of the card, and these perforations are in the form of a so-called six-place code, whose six horizontal lines are identified as Y, X, O, 1, 3, 5 as set forth in the table of Fig. 5. Thus, in Fig. 6 the lower field 14 is perforated to represent Binghamton. The upper field 13 is divided into four sections of four vertical columns each, in which perforations representing fares are made. Thus, in Fig. 6 the amounts 4.29 (one-way coach), 8.10 (two-way coach), 6.38 (one-way pullman) and 3.19 (half-fare pullman) are represented in fields designated 1C, 2C, 1P and ½P, respectively. For purposes of simplicity only, these four different fares are shown and the apparatus as disclosed is limited to handle only four fares, by way of example.

Reading unit

The reading unit, shown in the lower right hand part of Fig. 1 and in section in Fig. 8, has a slotted member 16 into which a card 12 selected from rack 10 is inserted into the position of Fig. 8, where it faces stationary contact segments 17 arranged in columns and rows corresponding to the perforating positions on the card. On the opposite side are brushes 18, one in line with the end of each segment. These brushes are secured to angle plates 19 pivoted at 20, which plates have horizontal portions fitted into notches 21 in links 22. The latter are mounted on parallel arms 23 for vertical movement so that, when the links 22 move down, plates 19 are rocked clockwise to tilt brushes 18 out of engagement with the card.

In Fig. 8 the links 22 are shown in their upper positions with the brushes 18 tilted against the card to make electrical contact through the perforations with the corresponding segments 17. The shaft 24 of one of the arms 23 (see Fig. 3) has secured thereto an arm 25 with a pin and slot connection to a link 26 whose opposite end connects with a follower lever 27 pivoted at 28. Cam 29, freely rotatable on shaft 30 will, upon rotation, rock shaft 24 through the linkage traced to tilt brushes 18 into card reading position, and an arm 31 secured to shaft 24 will snap under a latch 32 pivoted at 33. The brushes, when tilted into reading position, are thus locked in such position until a solenoid 34 is energized to rock latch 32 counterclockwise. Cam 29 (Figs. 1 and 3) has secured thereto an arm 35 to which there is pivoted a dog 36 held in the position shown by armature latch 37 of a magnet 38. Dog 36 lies in the plane of notched driving disk 39 secured to shaft 30, which shaft is constantly driven through a gear reduction unit generally designated 40 by a motor 41. Thus, upon momentary energization of magnet 38, dog 36 is released from engagement with disk 39 and cam 29 is driven for one revolution to cause tilting of brushes 18 into engagement with a destination card 12 inserted in the reading station.

When a card is so inserted, its lower edge (Fig. 8) will engage and rock the bell crank 42 to close a pair of so-called card lever contacts 43.

Operating keys

Just behind the reading station (Figs. 1 and 8) are six keys 44 designated 1C (one-way coach), 2C (two-way coach), 1P (one-way pullman), ½P (half-fare pullman), TOT (total) and CR (credit). These six keys form a bank and are of the well known commercial type including a bar 45 having apertures through which the key stems pass. Each key upon depression carries with it a plate 46 of insulated material in which there is embedded a wiper 47 which closes a circuit between two contacts 48. As usual, a depressed key will be latched down by bar 45 and subsequent depression of another key will release the previously depressed one by camming the bar 45 transversely to the length of the key stem. In Fig. 1 a solenoid 49, when energized, will rock lever 50 about its pivot to shift bar 45 to the left to release any depressed keys for return to upper position. A key bank of the type thus briefly described is shown in greater detail in the Mills et al. Patent 2,355,389.

In the circuit diagram (top of Fig. 21a), the contacts 48 are conventionally represented as simple key operated contacts, but it will be understood that when a pair of contacts is closed, they will be held so until released by the action of another key or upon energization of solenoid 49.

Ticket feed mechanism

The tickets are fed into the machine in the form of a continuous web or tape 60 from a suitable supply hopper or reel at the right of the apparatus (Figs. 2 and 15), in the latter of which printing rollers 61 are shown which serve to print on the two sides of the tape the usual data common to all tickets. This printing mechanism per se, which forms no part of the present invention, may be of the form disclosed in Mills Patent 2,111,121. The preprinted tape is initially led through the apparatus from rollers 61 to the guide 62, so that the first section thereof designated A (Fig. 2) extends to substantially the position shown in Fig. 2, where it is opposite platen 56 of the typewriter.

Referring to Fig. 2, the cam 29 when rotated will drive a bevel gear 63 integral therewith and this gear through a meshing bevel 64 drives a shaft 65 (Fig. 15) from which gearing generally designated 66 drives the feed rollers 61. On a shaft 67 of one of these feed rollers is secured a cam 68 which will rock an L-shaped follower 69 which has link connection 70 with a frame 71 (see Fig. 3). The frame 71 is mounted for horizontal movement in the stationary guide rails 72 of the typewriter through suitable ball bearings. Thus, when cam 68 of Fig. 15 is rotated, the frame 71 will be drawn to the right a short distance. This frame (Fig. 2) has pivoted thereto a pair of hooks 73 which are biased toward one another by a spring 74 so that their hooked ends bear against the opposite edges of the ticket tape 60.

When the frame is drawn toward the right as viewed in Fig. 2, the hooks 73 will slide along the tape edges and drop into the opposite notches 75 to thereby engage the vertical walls of the notches and draw the tape toward the right along with the frame. The parts are so proportioned that at the end of the rightward stroke of frame 71 the first ticket section A will be located in proper position with respect to the type bars of the typewriter to receive the first letter of the destination in the proper location on the ticket. Near the end of the rightward stroke of frame 71 a pin 76 in the lower hook 73 will engage an arm 77 secured to the rail 72 and the hooks 73 will be rocked away from the tape. At the same time, the pin 76 is rocked far enough to allow spring urged latch 78 to snap behind the pin and hold the hooks in their outer positions during the return movement of the frame. At the end of the return stroke, an extension 79 of latch 78 will strike a stationary plate 80 to rock the latch and release the hooks for reengagement with the edges of the tape.

*Stationary ticket clamp.*—The plate 80 (Fig. 13) is secured to the carriage guide rails 72 and has integral therewith a clamping block 81. Pivoted to the plate at 82 is a movable clamping block 83 integral with a latching finger 84 and an operating finger 85. The finger 85 cooperates with a cam plate 86 (Figs. 2 and 18), one end of which is connected at 87 to the reciprocating frame 71 so that, when frame 71 is moved toward the right as viewed in Figs. 2 and 18, the cam plate 86 will move therewith to cam finger 85 counterclockwise as viewed in Fig. 13 rocking block 83 to the open position and finger 84 will snap over and be held by a latch 88. This clamp opening action takes place at the beginning of the movement of frame 71 so that the clamp is opened to enable the ticket strip 60 to be retracted with the frame 71. The clamp will remain open until later in the operation of the apparatus a solenoid 89 is energized to rock latch 88 out of engagement with the finger 84.

*Movable ticket clamp.*—Referring to Figs. 2 and 17, the ticket strip 60 after passing through the stationary clamp 81, 83 passes through jaws 90, 91 on a plate 92 secured to the typewriter carriage frame 93 which is slidable in the stationary guides 72. Jaw 91 is integral with plate 92 and jaw 90 is pivoted to the plate at 94. It is held open by engagement of a spring urged latch 95 with pin 96 in an arm 97 of the jaw. Latch 95 has a depending finger 98 (see Fig. 17) which, when the carriage is in its position of Fig. 2, lies in the path of one arm of the bell crank 99 (Fig. 18) pivoted to a plate 100 secured to the rails 72. The bell crank has connected thereto a link 101 provided with a slot 102 engaging a pin 103 in the slidable frame 71. The action is such that near the extremity of the right hand movement of frame 71 pin 103 will shift link 101 toward the right to rock bell crank 99 against finger 98 to rock the latter and release jaw 90, so that it in turn will rock counterclockwise as viewed in Fig. 17 to clamp the ticket strip 60 against jaw 91.

Briefly, the movable frame 71 with its aligning levers 73 will retract the ticket strip to bring it into correct printing position, and thereupon the jaws 90, 91 will grip the ticket to secure it to the typewriter carriage 93 after which printing will take place and the ticket and clamp 91 will step or escape toward the left as viewed in Fig. 2 as typing proceeds. The strip 60 is clamped to the platen carriage until a carriage return and line spacing operation takes place. At such time the usual line space link 104 (Fig. 17) is drawn downwardly to actuate the platen line space pawl. Through a pin 105 in this link an arm 106 on rod 107 is rocked and through another arm 108 from the rod a link 109 (Fig. 17) is drawn toward the right and through a slot in its left end pin 96 is drawn to the right to open the clamp. Latch 95 will thereupon engage pin 96 to hold the jaws open until the carriage is returned and another reciprocation of the aligning frame 71 is effected.

*Ticket cutoff device.*—From the clamp 90, 91 (Fig. 2) the ticket strip passes through a guide 110 to a cutoff device (Fig. 14) which comprises a plate 111 secured to the carriage frame 93 and which has a fixed shear blade 112 and a movable shear blade 113 pivoted at 114. An arm of blade 113 is connected by a link 115 to a solenoid 116. Energization of the solenoid will rock blade 113 counterclockwise and shear the ticket when in the position of Fig. 2.

*Ticket date printer.*—From the shear 112, 113 the ticket strip enters a guide 117 from which its left end as viewed in Fig. 2 extends into the date printing mechanism shown in Fig. 16. This mechanism is supported on a plate 118 attached to the carriage frame 93 so that it also moves with the carriage. On the plate is supported a series of dating wheels 119 which are manually rotatable to set up any desired date. Ribbon spools 120 are provided and the ribbon therefrom is guided across the face of the wheels 119. Energization of a solenoid 122 will rock printing hammer 123 against the under side of the ticket to force it against the inked ribbon and the type wheels. At the same time through link 124a conventional pawl mechanism is actuated to advance the inked ribbon. Also, when link 124 is actuated, it closes a pair of contacts 125.

*Typewriter.*—The printing mechanism for printing the destination and fare on the ticket comprises a well known commercial form of power driven typewriter in which the carriage has been modified to handle a strip of ticket tape as explained above. In Figs. 1 to 20 a typewriter is shown as having the usual character keys 51a which operate corresponding type bars 51 and the functional keys which include the carriage return key 52 and the space bar 53. The key 51a to the right of the L key has its type bar altered to print an asterisk and the next adjacent key has its bar altered to print a credit symbol CR. The key 51a to the right of the M key is altered to close a pair of contacts 54 represented in Fig. 21d as the "ticket feed" contacts. This key does not cause a character to print but simply closes contact 54 to control circuits which feed a new ticket strip section into the machine.

The third key to the right of M key 50 is designated manual feed and it also simply closes a pair of contacts 55 (Fig. 21a) which set up circuits to permit manual production of a ticket, when no destination card 12 is available for a required destination. The typewriter also comprises the conventional rotatable platen 56 mounted on the typewriter carriage 93 and which supports a copy sheet or sales list 58. The carriage and platen are shortened for purposes of the invention and have a stroke of about the width of sheet 58. In Fig. 20 are shown the essential elements of the type bar actuating mechanism which comprises a power roller 126 which, when a key 51a is depressed, will be caused to rock the related type bar 51 through linkage 127 and cam 128.

Beneath each key is a solenoid 129 which, upon energization, will operate a related key 51a. For each numerical key there is provided a pair of contacts 50a and 50b positioned so that, when the cam 128 of any numerical key is controlled, a roller 130 will cause opening of contacts 50a and closure of contacts 50b. The typewriter is provided with the usual escapement mechanism.

Reference may be had to the Mills et al. Patent 2,377,801 for further detailed description of the typewriter construction. In the escapement action a lever 130a is rocked, as usual, and through linkage 130b, contacts 131a, 131b will be shifted.

*Tab contacts.*—Referring to Figs. 3, 10 and 11, the typewriter carriage 93 is provided with the usual notched bar 131 on which clips 132 may be positioned, and these clips may have a tab in any one of five vertical positions as indicated in Fig. 11, so that as the carriage moves the tabs will engage and rock levers 133 to shift related contacts designated in Fig. 11 as TC1—TC5. Supported by the carriage is a wiper 134 (Figs. 1, 3 and 12) which, as the carriage moves, traverses a stationary block 135 of insulating material, in which there is embedded columns of contact segments 136 and a common conductor 137 spaced so that, when the carriage is in any of the printing positions, the wiper 134 will connect the common conductor 137 with a related column of segments 136.

*Accumulator mechanism.*—The apparatus is provided with an accumulator mechanism shown in Figs. 22–25 which is driven from the main drive shaft 30 as follows. In Figs. 2 and 22 the shaft 30 has secured thereto a notched driving disk 140 with which a dog 141 pivoted to an arm 142 engages when magnet 143 is energized to attract its armature 144. Arm 142 has secured to a suitable sleeve a plurality of drive gears 145 of which there is one provided for each denominational order of the accumulator. The accumulating mechanism is the same as that illustrated and described in detail in Mills Patent 2,165,288, and its operation will therefore be but briefly explained.

Gear 145 meshes with gear 146 freely mounted on a post 147 and driven by gear 146 is a ratchet 148 (Fig. 24) which is spaced from the accumulating or adding element comprising a toothed adding wheel 151 and a tens carry cam 152 which are integral with rod 153. Ratchet 148 may be rocked into engagement with ratchet 158 to drive the latter, and such rocking is effected by a beveled disk 154 carried by a bell crank 155 which is normally latched in the position shown in Figs. 22 and 23 by the armature 156 of a magnet designated AM. When magnet AM is energized, bell crank 155 is released and spring 158 then rocks it to move disk 154 toward the axis of ratchet 148, thereby camming the ratchet 148 into driving engagement with the driven ratchet 158. Integral with gear 146 is a cam 159 (Fig. 23) provided with two spaced cam portions or lobes 160, each of which will effect uncoupling when it engages the nose of bell crank 155. Magnet AM is energized at differential times, i. e., 1, 2, 3, etc. cycle points before the first cam lobe 160 effects uncoupling, so that the extent of advance of the adding wheel is dependent upon such time of energization of magnet AM. The carry cam 152 controls the usual tens carry contacts comprising movable contact brush 161 (Fig. 25) and stationary blades 162 and 163 which function so that, whenever the wheel 151 passes from 9 to 0, the member 164 (Fig. 22) is rocked clockwise and held by latch 165 to hold the brush 161 in engagement with blade 162. Whenever the wheel 151 stands at 9, a depression in the cam 152 will permit member 164 to rock counterclockwise, thereby enabling brush 161 to rock clockwise and engage blade 163. The roller 166 is provided to release carry lever latch 165 at the end of the cycle.

The accumulator is also provided with a magnet SM which, if energized after magnet AM has effected coupling of the ratchets, will cause disengagement thereof. When magnet SM is energized, it attracts its armature 168 and releases a lever 169 pivoted at 170 so that spring 158 will rock the lever counterclockwise and a pin 171 thereon will strike the horizontal arm of bell crank 155 and rock the same clockwise into its uncoupling position. At a predetermined point in the cycle, a pin 172 (Fig. 23) engages the left end of lever 169 to relatch it on armature 168.

The rod 153 (Fig. 25) has a pair of brushes 173 secured at one end which cooperate with a set of spaced contact segments 174 and a common conductor 175 so that, when the accumulating wheel is positioned to represent any of the digits, one of the brushes 173 contacts the segment 174 related to that digit and the other contacts the conductor 175.

Circuit diagram

The operation of the apparatus will now be explained in connection with the circuit diagram in connection with which the several operations will be explained in sequental order, as they are carried out in the preparation of a ticket under control of one of the destination cards. As a preliminary, the sales list 58 (Fig. 2) is placed around the platen with a suitable carbon between it and the ticket strip 60 and the carriage is positioned so that the first column of the sales list (Fig. 4) is in position to receive the first printing impression. The ticket strip will have been inserted as previously explained to approximately the position shown in Fig. 2.

It will be assumed that the destination card selected is that shown in Fig. 6 and this is first removed from the rack 10 and inserted in the slotted member 16. It is also assumed that a one-way ticket is to be issued. Accordingly, the operator will depress the 1C key 44 (Fig. 1) after the card 12 has been inserted.

Referring now to Fig. 21a, current is supplied to main lines 180, 181 from a suitable source so that, when the 1C key 44 is operated to close its contacts 48, a circuit will be completed to energize relay magnets R1 and R2 in parallel. As explained, contacts 48 will be latched closed until their releasing solenoid 49 (Fig. 1) is energized. Relay magnet R1 shifts a set of contacts designated R1a (lower left corner of Fig. 21a) to connect the brushes 18 which sense the 1C field of the destination card to a group of wires 192 for sensing of this field later in the operation. Magnet R2 closes a pair of contacts R2a to complete a circuit from line 180, contacts 48 of the 1C key, contacts R2a, relay magnet R9, to line 181. A parallel circuit is also completed from the contacts R2a, through contacts R18a of magnet R18 and magnet R10 and line 181. Magnet R10 closes its contacts R10a (Fig. 21d) to complete a circuit from line 180, cam contacts CR1, contacts R64a, contacts 43 closed by the destination card, contacts R10a, magnet R61, to line 181.

The contacts CR1 and other contacts in the circuit prefixed with the designation CR represent contacts controlled by constantly running cams driven from the motor 41, which is initially placed in operation upon closure of switch 183 (Fig. 21b), together with the motor M2 which drives the power roller of the typing unit. The timing of the cam controlled contacts is shown in Fig. 9. In Fig. 21d magnet R61 closes its contacts R61a to establish a holding circuit from line 181, magnet R61, contacts R10a, contacts 43, contacts R61a, cam contacts CR3 to line 180. The holding period for magnet R61 is shown in the sequence chart (Fig. 19).

Contacts R9c are now closed (Fig. 21b) to connect magnets R57, R58 and R59 through contacts R9c and wire 182 (Fig. 21a) to the common conductor 137. The wiper 134 is in the 1 or first column position, connecting common 137 to the five segments 136 as represented in Fig. 21a.

Magnet R61 closes its contacts R61d (Fig. 21b) to complete a circuit from line 181, contacts CR2 (when they close near the end of a cycle), contacts R61d and clutch magnet 38 to the line 180. As a result, cam 29 (Fig. 3) rotates for one cycle to rock brushes 18 against card 12 and the brushes become latched in such rocked position. As a further result, cam 68 (Fig. 15) rotates for one cycle to draw frame 71 to the right and fingers 73 (Fig. 2) engage in tape notches 75 to draw the tape into its "first column" printing position. The clamp 81, 83 (Fig. 13) operates to permit such tape movement, and at the end thereof clamp 90, 91 closes to lock the tape to the typewriter carriage with the first printing position of the ticker section A (Fig. 2) in line with the first printing position of the list 58. The time relationship of these several operations is represented in Fig. 19.

Driven by the shaft 67 are two contact operating cams whose contacts are designated with the prefix PR and whose timing is as represented in Fig. 9, so that during the cycle of operation now occurring, contacts PR2 close to complete a circuit from line 181 (Fig. 21b), contacts PR2, contacts R62c, magnet R60 to line 180. Magnet R60 closes its contacts R60b to establish a holding circuit through normally closed contacts TC5 which remain closed until the carriage has been advanced to its last column printing position.

When contacts PR1 close, a circuit is completed from line 180 (Fig. 21d), contacts PR1, contacts R62d and magnet R64 to line 181. Magnet R64 closes its contacts R64a to form a holding circuit through contacts CB1, which open after the amount has been accumulated.

In Fig. 21a contacts R60d close to complete a circuit from line 180, contacts R60d, escapement contacts 131a, contacts R19b, R56d, to common 137. From here the circuit continues through the wiper 134 to the five segments 136 which are wired to reading segments 17 associated with the first card column in which (for the present example) there are perforations representing the letter B in the 1 and Y positions (see Figs. 5 and 6). Thus, a circuit continues from the Y segment 17, through the card hole 15, brush 18 and magnet R21 to line 181. A second circuit continues from the 1 segment 17, through the card hole 15, brush 18 and magnet R31 to line 181.

Figure 21C:
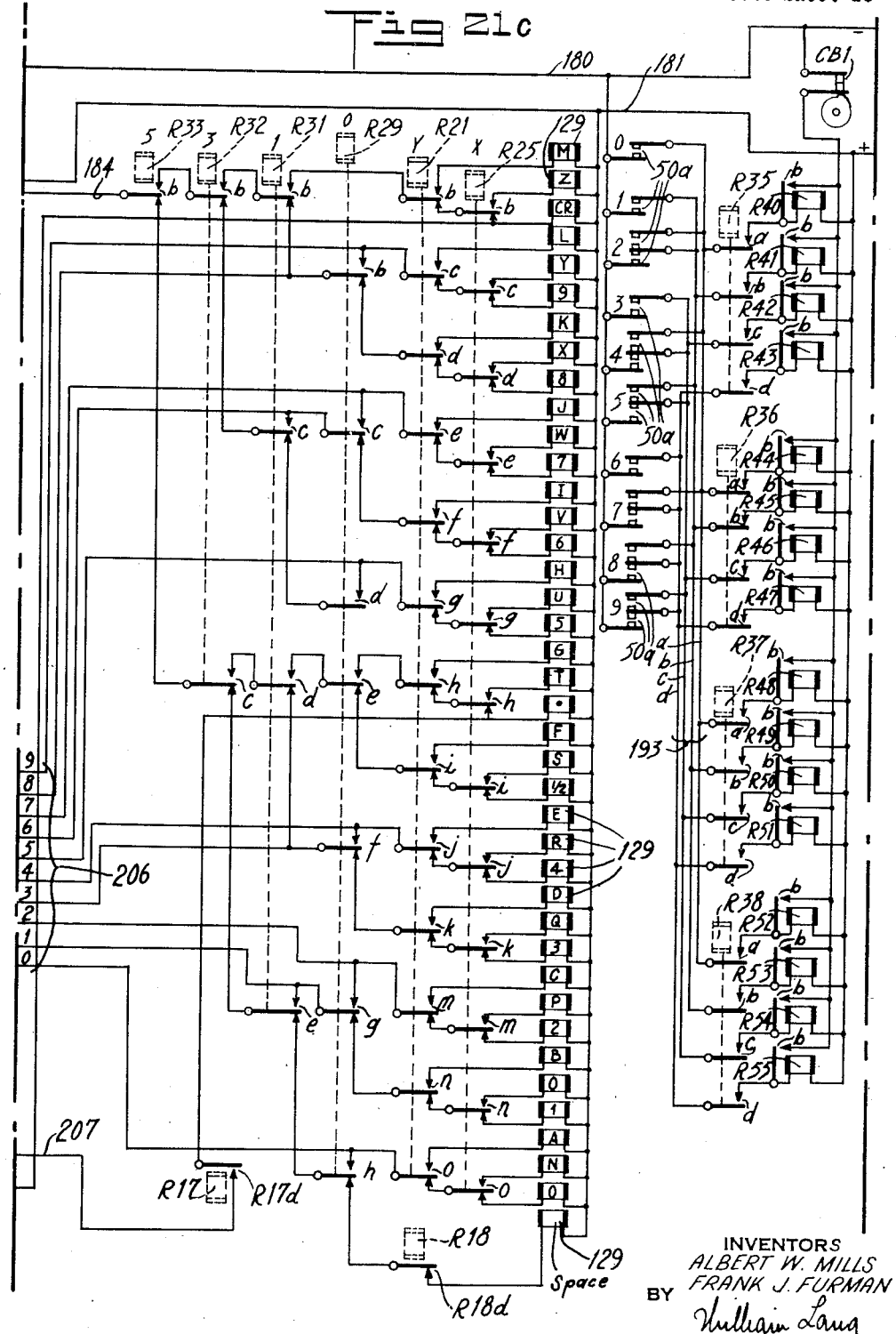

Concurrently with the energization of these two magnets, there is a circuit completed from common 137, wire 182 (Fig. 21b), contacts R9c (now closed) and magnet R57 to line 181 (see Fig. 19). Magnet R57 closes its contacts R57a to energize magnet R58 which in turn closes its contacts R58a to energize magnet R59 and close contacts R59a. The successive energization of magnets R57, R58 and R59 provides a time delay to insure the combinational energization of the magnets R21, R25, R29, R31, R32 and R33 and the shifting of their contacts in Fig. 21c, so that when contacts R59a close a circuit is traceable from line 180 (Fig. 21a), contacts R60d, escapement contacts 131a, R19b, R56d, wire 182 (Fig. 21b), contacts R9c, R57a, R58a, R59a, to wire 184 (Fig. 21c). For the example chosen, wherein magnets R21 and R31 are now energized, the circuit continues through b contacts of magnet R33 (normal), c contacts of magnet R32 (normal), e contacts of magnet R31 (shifted), g contacts of magnet R29 (normal), n contacts of magnet R21 (shifted), and B type bar magnet 129 to line 181.

The contacts controlled by the magnets R21, R25, R29, R31, R32, R33 are interconnected as shown in Fig. 21c to form a translating device through which current applied to wire 184 will extend to one of the magnets R129 corresponding to the combination represented in the card column being sensed. The energization of magnet R129 will operate the related type bar 51 (Fig. 20) to print the letter B on the ticket and also on the sales list 58, as shown in Fig. 4. The escapement lever 130a (Fig. 20) is operated as an incident to the printing action and the carriage will be escaped to the next position or column. The action of lever 130a will through linkage 130b open contacts 131a and close contacts 131b momentarily. The opening of contacts 131a will break the circuits to the selecting magnets R21—R33 and also to the delay magnets R57—R59.

Referring to Fig. 21a, a magnet R20 is normally energized through a circuit traceable from line 181, magnet R20, escapement contacts 131a, contacts R60d, to line 180. As soon as the escapement contacts 131a open, magnet R20 becomes deenergized and magnet R19 will be energized through the following circuit: from line 180, contacts R60d, contacts 131b, winding of magnet R19 to line 181. The contacts R20a will thereupon form a holding circuit traceable from line 180, contacts R60d, contacts R20a, contacts R19a, winding of magnet R19 to line 181. Magnet R19 is a so-called "fast" relay which picks up rapidly and drops out slowly, while magnet R20 is a "slow pickup" magnet with a fast dropout. When the escapement contacts return to normal, magnet R20 will become energized again through the circuit traced. Upon opening of its contacts R20a, magnet R19 will become deenergized.

Along with the reenergizing circuit of magnet R20, there is a circuit traceable from line 180, contacts R60d, contacts R131a, contacts R19c, a holding winding of magnet R19, and magnet R20 to line 181. This holding circuit for magnet R19 is shorted through wire 185 and due to inductive currents the deenergization of magnet R19 will be slowed down. This will keep contacts R19b open for a sufficient period after contacts 131a start to reclose to allow ample time for the carriage escapement action, that is, sufficient time for the wiper 134 to contact the next column of segments 136.

In the second column, the card 12 is perforated to represent the letter I, with perforations occurring in the Y, 1 and 5 positions, so that now circuits are completed to energize magnets R21, R31 and R33 accompanied by energization of magnet R57. Thereafter, magnets R58 and R59 are energized in succession and, when contacts R59a close, the circuit from wire 184 (Fig. 21c) will be completed through the translating contacts of the magnets to energize the I magnet 129. This will result in printing the letter I on the ticket and list followed by an escapement action as before, to advance wiper 134 to the next or third column as well as to advance the carriage to the third printing position, where the operations are repeated to print the letter N.

Referring to Fig. 19, these operations are repeated for the remaining letters punched in card 12. After the last letter N is printed, the carriage escapes to column 11. In this column there are no character perforations in the card, so that none of the magnets R21—R33 will be energized. However, the magnet R57 will be energized as before followed by successive energization of magnets R58 and R59. Accordingly, when the contacts R59a close to complete the circuit to wire 184 (Fig. 21c), the circuit will extend through the b contacts of magnet R33 (normal), c contacts of magnet R32 (normal), e contacts of magnet R31 (normal), h contacts of magnet R29 (normal), contacts R18d, to the space magnet 129. This magnet will operate the space bar of the typewriter to effect a spacing operation without accompanying printing. This spacing operation will be repeated through columns 12–18 as represented in Fig. 19, and the carriage ultimately escapes into column 19 with wiper 134 contacting the segments 136 related to this column (see (Fig. 21b).

It will be recalled that the 1C key 44 had been initially operated to close its contacts 48 and cause energization of magnets R1, R2, R9 and R10. These magnets are therefore energized at the present time. Accordingly, when wiper 134 is in its column 19 position, a circuit is traceable to the common 137 (Fig. 21b) as before, and thence it continues through wiper 134 to the uppermost segment 136, column 19, wire 186, contacts R9b, 1 wire of the group designated 187 (Fig. 21a) to magnet R31. Concurrently, the magnet R57 is energized as before, and then magnets R58 and R59 in succession, so that the translating circuit is then traceable in Fig. 21c from wire 184, b contacts of magnet R33 (normal), c contacts of magnet R32 (normal), e contacts of magnet R31 (shifted), g contacts of magnet R29, n contacts of magnet R25 (normal) to the 1 magnet 129 and line 181, resulting in the printing of the character 1 in column 19 of the ticket and list with incidental escapement to column 20, wherein the letter C is to be printed. This is effected as follows. With wiper 134 contacting the segments 136 of column 20, a circuit is traceable from the common 137, through the wiper to the uppermost segment 136, thence through wire 188, contacts R2b to the Y wire 187 (Fig. 21a) to energize magnet R21. Concurrently, there is a circuit from common 137, wiper 134 to the center segment 136 of column 20, wire 189, contacts R9d to the O wire 187 to energize magnet R29. Finally, there is a third circuit from common 137, wiper 134, the fourth segment 136 from the top, wire 190, contacts R9a to the 1 wire 187 to energize magnet R31.

Accordingly, when contacts R59a close, the magnets R21, R29 and R31 representing the letter C will be energized and through the translating contacts of Fig. 21c the C magnet 129 will be energized in the now familiar manner, resulting in printing the letter C and escapement to column 21. In this column there will be no energization of any of the magnets R21—R33, so that the automatic spacing takes place as before and, as indicated in Fig. 19, is repeated by a similar automatic spacing through column 22 so that now the wiper is in contact with the segments 136 of column 23. Just before this, if the wiper 134 is at column 22, magnet R35 is energized through a circuit traceable from common 137 (Fig. 21b), wiper 134, lowermost segment 136 of column 22, a contacts of magnet R16 (normal), magnet R35 to line 181. This magnet controls the entry of a fare digit into a storage device, if such digit is to be printed in column 22. For the present example, there is no fare digit so printed, so the energization of magnet R35 is an idle operation.

When the carriage escapes to column 23, a magnet R36 will be energized through a similar circuit extending through the b contacts of magnet R16. When the carriage is in column 25, magnet R37 will be energized through the c contacts of magnet R16. When the carriage is in column 26, magnet R38 will be energized through the d contacts of magnet R16. With the carriage now in column 23 position, the digit 4 perforated in the 1C field of card 12 is to be read and printed. This is effected through circuits as follows. The segments 136 in column 23 are connected through a group of wires 191 (Fig. 21a), contact segments 17 in line with the second punching position in the four amount fields, and for the perforation in the O and 3 positions circuits are traceable from common 137 (Fig. 21b), wiper 134, segments 136, wires 191 (Fig. 21a), to the O and 3 segments 17, the holes in these positions, thence through contacts R1a (now in shifted position), wires 192, to magnets R29 and R32. Again, this energization is accompanied by energization of magnet R57 followed by R58 and R59 so that, through the translating contacts of Fig. 21c, the 4 magnet 129 is energized to print a 4. Accompanying the printing action, contacts 50a (Fig. 20) will be closed.

At this time, as explained, magnet R36 is energized so that its contacts a, b, c and d are closed (Fig. 21c). Therefore, upon closure of contacts 50a a circuit is completed in Fig. 21c from line 180, contacts 50a related to digit 4, to the a and c wires 193, thence through the a and c contacts of magnet R36, magnet R44 and R46 in parallel to line 181. These magnets close their b contacts to provide holding circuits from line 181, magnets R41 and R46, their b contacts and cam contacts CB1 to line 180. These magnets will remain held until after the adding operations are completed and their period of energization is as indicated in Fig. 19, where the points at which the magnets R35—R38 are energized are also shown.

In a similar manner, when the carriage is in the column 25 position, the next digit column in the 1C field of the card 12 is sensed to energize magnets R29 and R31 representing the 2 followed by energization of the 2 magnet 129. This in turn closes the contacts 50a related to the digit 2, so that circuits are completed through the a and b contacts of magnet R37 (now closed), to energize magnets R48 and R49. Finally, when the perforations representing the digit 9 are sensed with the carriage in column 26 position, the magnets R29, R32 and R33 are energized to cause printing in the 9 position and the closure of the contacts R50a related to this digit will through the c and d contacts of magnets R38 now closed energize magnets R54 and R55.

When the carriage is in its column 24 position, a period is automatically printed through circuits extending from the common 137 (Fig. 21b), wiper 134 and the three uppermost segments 136 of column 24 which are directly connected to the O, 1 and 3 wires 187 extending to magnets R29, R31 and R32 in representation of the code for a period (see Fig. 5). As a result, the magnet 129 (Fig. 21c) which controls the period printing key will be energized.

When the carriage reaches its column 27 position, contacts TC4 (Fig. 21d) close and complete a circuit from line 180, contacts TC4, contacts R60a (now closed), and magnet R67 to line 181. This magnet closes its contacts R67a to provide a holding circuit from line 181, magnet R67, contacts R67a and cam contacts CB3 to line 180, which will maintain the magnet energized for the period indicated in Fig. 19. This magnet closes a pair of contacts R67b (Fig. 21a), completing a circuit from line 180, contacts R60d, escapement contacts 131a, contacts R67b, magnet R56 to line 181. This magnet in turn closes its contacts R56b to provide a holding circuit from line 181, holding coil of magnet R56, contacts R56b, contacts TC3 (normally closed), contacts R60d to line 180. The magnet R56 will accordingly remain energized until the contacts TC3 open under control of the carriage when it reaches its column 42 position. It closes a second pair of contacts R56a (Fig. 21a) to energize the magnet 129 which operates the tabular key, so that the carriage is freed for uninterrupted movement in accordance with a preset stop which will stop the carriage in what may be called a column 42 position.

In this column 42 position the contacts TC3 open, deenergizing magnet R56 and at this point also the contacts TC5 (Fig. 21b) shift to deenergize magnet R60 as indicated in Fig. 19. The shifting of contacts TC5 will complete a circuit from line 181, upper contacts TC5, carriage return magnet 129 to line 180. This magnet operates the usual carriage return key, so that the carriage is automatically returned to its first column position. The magnet 89 is energized concurrently therewith so that the stationary clamp 81, 83 (Fig. 13) is operated to hold the ticket against return with the carriage.

It will be recalled in connection with the mechanical description that operation of the line space and return mechanism releases ticket clamp 90, 91 so that the ticket is free from the carriage. The carriage return key also has a pair of contacts 50a controlled thereby (Fig. 21d) which, upon closure, will energize magnet R66 through a circuit from line 181, magnet R66, carriage return contacts 50a, contacts R64a (now closed), contacts CB1 to line 180. The magnet closes its contacts R66a to provide a holding circuit through contacts CB3 so that this magnet R66 will remain energized for the period indicated in Fig. 19. A second pair of contacts R66b closes to complete a circuit from line 180 (Fig. 21d), contacts CR1, contacts R66b, magnet R63, to line 181. This magnet in turn closes its contacts R63a to provide a holding circuit through contacts CB3. Contacts R63b (Fig. 21b) close a circuit to energize the accumulator drive clutch magnet 143 traceable from line 181, contacts CR2, R63b, and magnet 143 to line 180. As a result, the adding mechanism will now go through a cycle of operation during which the amount 429, which is set up on the storage magnets R40—R55, will be entered into the accumulator.

Concurrently with the energization of clutch magnet 143, the key release magnet 49 will also be energized through a circuit from line 181, contacts CR2, R63b, contacts R5c (normally closed), and magnet 49 to line 180. This magnet will release the operated key 44 and the magnets R1, R2, R9 and R10 will become deenergized. Just before this occurs, there is a circuit which branches from contacts R5c, through the right hand contacts R10c to energize magnet 34 which, as explained in connection with Fig. 3, will release the reading brushes so they may move away from the card 12.

In Fig. 21d, the storage magnets R40—R55 control sets of contacts generally designated e, f and g, and for the example under consideration magnets R44, R46, R48, R49, R54 and R55 are energized and their related contacts are shifted. A distributor brush 195 driven by the adding drive mechanism now traverses segments 196 and circuits will be completed through the contacts and storage magnet contacts to energize the magnets AM in the several orders of the accumulator to enter the value 429 therein. The entry of 4 in the hundreds order magnet AM is effected through a circuit traceable from line 180, contacts CB4, brush 195, 4 segment 196, b contacts of the magnet R11 (in normal position), the fifth wire from the left of the group generally designated 197, f contacts of magnet R44 (shifted), f contacts of magnet R45, g contacts of magnet R46 (shifted), g contacts of magnet R47 (normal), a contacts of magnet R68 (in normal position), a contacts of magnet R70 (also in normal position), magnet AM in the hundreds order to line 181. This energization of magnet AM occurs four steps before the adding wheel clutch is mechanically disengaged so that the related wheel is advanced four steps to effect an entry of 4.

In a similar manner, when the wiper 195 is at the 2 segment 196, a circuit will be completed to energize the AM magnet in the tens order and prior to this, when the wiper 195 contacts the 9 segment 196, a circuit is completed to energize the AM magnet in the units order. Thus, during the first half revolution of the adding drive shaft, the amount standing in the storage magnets is entered into the accumulator. If the accumulator already contains an amount and the present entry rotates a wheel through its 10 position, carry circuits will be completed to add a unit into the higher order wheel. This is effected as follows.

When contacts CB2 close (Fig. 21d), magnet R68 will be energized to shift its a contacts to disconnect the adding magnets from the storage contact circuits and will also close a pair of contacts R68b to complete a circuit from line 180, contacts CB4, right hand contacts R68b, closed contacts R70d to wire 198, which extends to all of the contact elements 163. If in any position, for example, the units position, the wheel has advanced through 10, the movable contact 161 will be in engagement with element 163 and the circuit will continue through the upper a contact of magnet R70 and the lower a contacts of magnet R68 (now closed), another a contact of magnet R70 to magnet AM in the tens order.

If in this tens order the wheel is standing at 9, the circuit will branch through contact element 162 and 161 in the tens order, thence through a contacts of magnet R70 and R68 to the magnet AM in the hundreds order. This carry circuit, as usual, occurs one step before the second mechanical knockout action, so that when magnet AM is energized the related wheel will advance one additional step.

During the adding operations when contacts CB2 (Fig. 21b) close, a circuit is completed from line 181, contacts CB2, contacts R5b, and cutoff magnet 116 to line 181. The circuit also branches through date printing magnet 122. As a result, the ticket shear 113 of Fig. 14 is operated to sever the left hand section of the ticket, while the dating mechanism makes an impression on the back of the ticket, so that a completed ticket now rests in the receptacle 117 (Fig. 2), from which it may be removed. As noted in Fig. 19, the magnets will all be deenergized at the end of the operation and the machine will be in readiness for the preparation of a new ticket.

Operation of the dating mechanism will cause closure of contacts 125, but their closure at this time is ineffectual and their function will be explained later. Further tickets are automatically prepared in the same manner as just explained.

Where a one-way pullman ticket is to be issued, the operator presses the 1P key 44 and, as a result, operations will take place in the same manner as explained in response to the operation of the 1C key 44, the difference being in printing 1P in columns 19 and 20 instead of 1C. This is brought about as follows. In Fig. 21a, operation of the 1P key will cause energization of magnets R6 and R7 with the latter closing its contacts R7a to also energize magnets R9 and R10, which will then remain energized until the adding cycle commences. When the typewriter carriage is in its column 19 position, the familiar circuit extending to the common 137 (Fig. 21b) extends through wiper 134, the uppermost segment 136 and wire 186, contacts R9b, to the 1 wire 187 (Fig. 21a) to energize magnet R31, resulting in the printing of a 1 and escapement of the carriage to column 20. In this column the circuit extends from common 137 to the segments 136, thence through the contacts R7b now closed to the X wire 187 and magnet R25.

A parallel circuit also extends from the segments 136, through contacts R9a, to the 1 wire 187 and magnet R31, while a third circuit extends from the segments 136, through contacts R9d to the 0 wire 187 and magnet R29. The magnets R25, R29 and R31 through their translating contacts in Fig. 21c will energize the P type bar magnet 129 to print the letter P in column 20.

In Fig. 21c the magnet R6 shifts contacts R6a at the bottom of the drawing, so that the card reading segments 17 related to section 1P are connected to the wires 192. Accordingly, when the carriage is in column positions 22, 23, 25 and 26, the amount perforated in field 1P of the card will be sensed by brushes 17 to control the printing operations and set up the amount in the storage magnets for subsequent entry into the accumulator.

The operations for half-fare pullman are also substantially the same as for one-way coach and one-way pullman, excepting that the ½P key 44 (Fig. 21a) is operated to energize magnet R8 whose contacts R8a will complete the circuit to magnets R9 and R10. Accordingly, when the carriage is in column 19, printing of the symbol ½ is completed from common 137 (Fig. 21b), wiper 134, contacts R8b to the 3 wire 187, energizing the magnet R32. A parallel circuit also extends through the contacts R9b to the 1 wire 187, energizing the magnet R31. From Fig. 21c it will be noted that these two magnets will cause energization of the magnet 129 designated ½ to print this designation. During the sensing of the ½P field of the card, none of the magnets R1, R3 or R4 is energized so that their contacts (lower part of Fig. 21a) remain in normal position for completion of the circuits through contact segments 17 and brushes 18 in the ½P section to wires 192 and magnets R29 to R33, so that the ½P fare will be printed and entered on the storage contacts for subsequent entry into the accumulator.

Round trip ticket

Where a round trip ticket is to be issued, the operator presses the 2C key 44 and this will result in the issuance of a ticket as shown in Fig. 4 formed by two separate tickets, on the left one of which only the destination and class of ticket are to be typed and the second will have typed thereon the destination, class of ticket, and amount of fare. The manner in which this ticket is prepared is as follows. Operation of the 2C key 44 in Fig. 21a will result in energization of magnets R3, R4 and R5 with contact R5a causing energization of magnets R9 and R10. These five magnets will now remain energized throughout the ticket printing operations for both sections and until key 44 is released. All operations occur as explained for the one-way tickets, that is, the destination field in the card is sensed column by column and printed on the left section of the ticket. In column 19 the 2 is to be printed instead of a 1, and this is effected by completion of a circuit from common 137 (Fig. 21b), and the column 19 segments 136, through contacts R9b to the 1 wire 187 and magnet R31, while a parallel circuit extends through contacts R4b to the 0 wire 187, and magnet R29. These two magnets will select the circuit for energizing the 2 magnet 129.

In the column 20, the letter C is to be printed, and this will be through circuits the same as traced for printing a C for one-way coach fare. When the carriage escapes to column 21, contacts TC2 (Fig. 21a) close to energize magnet R56 as follows: from line 180, contacts R60d (now closed), escapement contacts 131a, contacts R4c (now closed), contacts R65d, contacts TC2, magnet R56 to line 181. Magnet R56 closes its contacts R56b to provide a holding circuit until the contacts TC3 open in the column 42 position. It will be noted that magnet R56 is energized earlier than for one-way ticket operation. Contacts R56a close to energize the tabular magnet 129, so that the typewriter carriage is free to move rapidly from its 21 column position to its column 42 position. As it does so, contacts R56d are opened to break the feed circuit to the common conductor 137, so that during the tabular movement no circuits are completed through the segments 136. Hence, no further data (i. e. the fare) is read from the card 12. Contacts R56c (Fig. 21d) close to complete a circuit from line 180, contacts R5e (now closed), contacts R56c to magnet R67 and line 181. This magnet, as before, closes its contacts R67a to provide a holding circuit through contacts CB3.

As previously explained, whenever the carriage reaches its column 42 position, contacts TC5 (Fig. 21b) shift to energize the carriage return magnet 129 and magnet 89, so that the ticket strip 60 is clamped against movement while the carriage returns to its first column position. At the same time as before, magnet R60 becomes deenergized to break the circuits through contacts R60d (Fig. 21a). The magnet R66 (Fig. 21d) is energized as before through the carriage return contacts 50a and will in turn cause energization of magnet R63 to close its contacts R63b in Fig. 21b and energize the clutch magnet 143 to drive the accumulating mechanism for a cycle. Inasmuch as the reading of the amount field on the destination card has been suppressed, there will be no entries standing in the storage magnets R40—R55 so that the adding cycle will be idle, since no amount is set up for entry. Since magnet R5 is energized, its contacts R5b (Fig. 21b) are open so that, when contacts CB2 close during the adding cycle, the circuit to the cutoff magnet 116 is not completed and the ticket is not severed. The date magnet 122 will, however, be operated as before to date the first half of the round trip ticket.

With the operation of the date mechanism, the contacts 125 closed thereby will complete a circuit in Fig. 21d from line 180, contacts 125, contacts R5d (now closed), magnet R65 to line 181 which closes its contacts R65b to complete a holding circuit from line 180, contacts R65b, R5d and magnet R65 to line 181. In Fig. 21b contacts R5c are open so that the circuits to the key release magnet 49 and the brush release magnet 34 will not be completed, and the setting of the keys will be maintained and the brushes 18 will remain against the card. Magnet R64 will deenergize (Fig. 21d) upon opening of contacts CB1 and, since magnet R10 is kept energized to continue latching of the 2C key 44, the magnet R61 will be reenergized through the circuit from line 180, contacts CR1, contacts R64a (now closed), contacts 43, R10a and magnet R61 to line 181. Energization of magnet R61 as before reinitiates a series of operations during which the destination card is read a second time, after the ticket tape has been adjusted to bring the first printing position of the next section of the tape into proper columnar alignment and the ticket tape clamped to the typewriter carriage.

The destination is printed on the second section of the ticket along with the classification designation 2C in columns 19 and 20 as before and, with magnet R65 now in energized condition and its contacts R65d, (Fig. 21a) open, the tabulator magnet 129 will not be energized when column 21 is reached. The amount of fare will therefore be typed and stored as in previous examples for subsequent entry into the accumulator after the carriage return operation. At the end of the accumulating cycle, the key release magnet 49 is energized through contacts R65a and R63b, and the magnet 34 will also be energized through these contacts and contacts R10c (shifted), so that the magnets R3, R4, R5, R9 and R10 will be deenergized. When contacts CB2 close near the end of the cycle, the cutoff magnet 116 will be energized to sever the double section from the tape.

*Manual ticket operation*

Where a ticket is prepared for a destination for which no card 12 is available, the operator will press the appropriate classification key 44 and will then operate "manual feed" key 51a (Fig. 21a) to close contacts 200 which will energize magnet R18 shifting its contacts R18a to deenergize magnet R10 (which was initially energized through operation of one of the classification keys 44). The holding circuit is set up from line 181, magnet R18, its shifted contacts R18a and thence through either contacts R2a, R5a, R7a or R8a and one of the related classification keys to line 180, so that magnet R18 is held until the operated key is subsequently released. Magnet R18 opens its contacts R18d (Fig. 21c) so that space magnet 129 cannot be operated automatically. The magnet also closes its contacts R18c (Fig. 21d) to energize the starting control magnet R61, through a circuit from line 180, contacts CR1, R64a, R18c, magnet R61 to line 181.

Shortly thereafter, contacts CR2 close (Fig. 21b) to energize magnet 38 which controls the adjustment of the tape and the rocking of the reading brushes as before. The circuit is also completed through contacts R61e and contacts R10c (normal) to energize the magnet 34 so that the brushes 18 will immediately be unlatched, since there is now no card in reading position. When the ticket reaches the first column position, no printing circuit will be completed since no card is present. Since the automatic spacing circuits are broken, the operator will then type in the destination by manual operation of the typewriter keys 51a. The class of ticket will be automatically printed in columns 19 and 20, as soon as the carriage is manually spaced or skipped over to the column 19. The operator must then space the carriage over to the correct column for fare and operate the keys to print the correct amount.

The decimal point in column 24 will be automatically printed as before and will serve as a check to insure that the fare is typed in the correct place on the ticket. As soon as column 27 is reached, magnet R67 will be energized as before and from this point on operations will proceed automatically to return the carriage and effect an adding cycle during which the fare, which was entered into the storage magnets during the typing thereof, will be transferred to the adding mechanism.

*Correcting operation*

Should the operator strike or depress an incorrect classification key 44 and produce an incorrect ticket, he will thereafter issue a second ticket by first pressing the CR key 44 and also the classification key 44 which produced the error. The effect of this is to produce another ticket exactly like the one in error with the exception that the second one will have the symbol CR printed thereon as shown in Fig. 4. This CR symbol is controlled through the operation of the CR key 44 in Fig. 21a to energize magnet R11 which in Fig. 21b closes contacts R11a, R11b and R11c. When the ticket is in column 21 position, circuits will be completed through the 1, 3 and 5 wires 187 to energize magnets R31, R32 and R33 to cause printing of the symbol CR in column 21.

During the adding cycle the fare will be subtractively entered in the accumulator to cancel out the previous entry. This is effected through shifted b contacts of magnet R11 (Fig. 21d) which in the well-known manner invert the circuits between the distributor 195, 196 and the contacts of storage magnets R40—R55, so that the amount added in each denominational order will be the 9's complement of the amount.

In positions in which no entry has been made in the storage magnets, a 9 will be entered through a circuit traceable in Fig. 21d from line 180, contacts CB4, brush 195, 9 segment 196, uppermost b contacts of magnet R11 (shifted), left hand wire 197, g contacts of magnets R41, R42, R43 (for the thousands order), a contacts of magnet R68 (normal), a contacts of magnet R70 (normal) and magnet AM in the thousands order to line 181. In the two extra orders, 9's will be automatically entered through a parallel circuit branching from the left hand wire 197, wire 202, a contacts of magnet R68, a contacts of magnet R70 to magnet AM in the two highest orders.

The addition of the 9's complement to a significant amount already in the accumulator will cause a tens carry operation in the highest order, so that its contacts 161, 163 close. At the carry time this will result in adding the so-called fugitive one into the units order through a circuit from line 180, contacts CB4, R68b (shifted), R70d, wire 198, contacts 163, 161 in the highest order, a contacts of magnet R70, wire 203, a contacts of magnet R68 (units order), a contacts of magnet R70 to the units magnet AM and line 181. This will cancel out the effect of an erroneous entry and the operator can proceed to produce a correct ticket. This series of operations is represented in Fig. 4 which shows the manner in which the sales list will indicate the several operations, listing the ticket made in error followed by the correcting entry identified by the CR symbol, in turn followed by the correct entry. A correction may also be made manually, in which case the manual ticket key is depressed after the correction key and class key.

*Total printing operation*

The total operation is to clear the accumulator. During such operation the so-called closing ticket as shown in Fig. 4 will be issued and the total of the day's sales or transactions will appear on the sales list. For this operation there is no destination card initially in the reading station, and the operator will depress the total key 44 to close the related contacts 46 and energize magnets R15, R16 and R17.

Magnet R17 closes its contacts R17b (Fig. 21d) to complete the circuit from line 180, contacts CR1, R64a, R17b, and magnet R61 to line 181. Clutch magnet 38 (Fig. 21b) is energized as before through contacts R61d and CR2 to align the ticket tape and, when contacts PR2 close, magnet R69 is also energized as before. Since magnet R10 is now deenergized, the circuit is also completed from line 181, contacts CR2, R61e, R10c (normal) and magnet 34 to line 180 to release the brushes 18 to their inactive position. With the carriage in column 1 position, contacts TC1 (Fig. 21a) are closed and a circuit is traceable from line 180, contacts R60d, 131a, R15a, TC1, and magnet R56 to line 181 which holds as before through contacts TC3. The tabulator magnet 129 is energized through contacts R56a to release the carriage for free movement to column 19 position, wherein contacts TC3 open to deenergize magnet R56. As a result, there is a circuit traceable from line 180, contacts R60d, 131a, R19b, C56d, to common 137. Thence, in column 19 (Fig. 21b) the circuit continues through wiper 134, segment 136 next to the lowest, contacts R15b and asterisk type bar magnet 129 to line 181, causing an asterisk to print in column 19, indicative of a total.

In Fig. 21b, adding wheel brushes 173 will now be standing in position to represent the total 002996 and, when the carriage escapes to column 20, a circuit is completed from conductor 137, lowermost segment 136 in this column, lowest wire or a group 205, d contacts of magnet R15, common 175, brush 173 (set at O), O wire 206 (Fig. 21c), O contacts of magnet R21, O contacts of magnet R25, to O type bar magnet 129, to print a zero and space.

In the next column 21, this circuit is repeated and in columns 22 and 23 the circuit extends through the 2 and 9 wires 206 respectively to energize the 2 and 9 magnets 129. In column 24, the period magnet 129 is energized through a circuit from common 137 (Fig. 21b), lowermost segment 136, wire 207 (Fig. 21c), contacts R17d to the period magnet 129. In columns 25 and 26, the 9 and 6 magnets 129 will be energized as traced for other columns.

When the carriage escapes to column 27, magnet R67 will be energized as explained through contact TC4 (Fig. 21d) and magnet R56 will also be energized to in turn energize the tabular magnet 129, so that the carriage escapes to column 42, shifting contacts TC5 to initiate the carriage return operation as explained. Magnet 143 (Fig. 21b) is also energized as before to initiate the accumulating cycle wherein contacts CB4 close and a circuit is completed from line 180 (Fig. 21d), contacts CB4, wiper 195, 10 segment 196, wire 208, all of the a contacts of magnet R70 (now shifted) to all the AM magnets.

Magnet R70 was energized earlier through a circuit from line 180, contacts CB1, contacts R17c and magnet R70 to line 181 and held through its b contacts and contacts CB1. Accordingly, all the adding wheels commence to rotate ten steps in advance of the first knockout point.

As each wheel reaches its home or O position, it closes its carry contacts 161, 163 which complete a circuit traceable in each order from line 180, contacts CB4, R68b, R70d (shifted), wire 198, contacts 163, 161, a contacts of magnet R70 (shifted) and magnet SM to line 181. This will uncouple the adding wheel and leave it in cleared or O position. At the normal tens carry time, magnet R68 is energized to prevent a second circuit to magnet SM.

Near the end of this total cycle, the dating magnet 122 and the cutoff magnet 116 are energized to date and cut off the closing ticket. This total operation may also be carried out at the very beginning of the use of the apparatus to issue a total ticket which will show any amount that may be standing in the accumulator. Thus, in Fig. 4 a so-called "opening ticket" shows a total 0000.00 indicating that the accumulator is clear.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a ticket issuing apparatus, means for sensing a control card for designations representing a destination and a plurality of classified fares, a typewriter having a platen carriage and spacing mechanism therefor, means for supporting a ticket tape adjacent the platen, a plurality of classification keys, one for each of said fares, mechanism controlled by any of said keys for adjusting the tape into aligned registration with the platen and for clamping the tape to the carriage, means controlled by the sensing means for causing the typewriter to type the destination on the tape, means controlled jointly by the selected key and the sensing means to cause the typewriter to type a selected fare on the tape, and means effective upon completion of said typing for causing severance of the section of the tape containing the typing from the remainder of the tape.

2. In a ticket issuing apparatus, a typewriter carriage reciprocable across a printing position, a ticket tape holder secured to the carriage for supporting a tape, a clamping device for securing the tape to the carriage for movement therewith, whereby the tape advances with the carriage during typing operations, a stationary clamping device, automatic carriage return mechanism, means controlled by the carriage when it has advanced to a predetermined position for causing operation of said carriage return mechanism, for causing said first clamping device to release the tape and for causing said stationary clamping device to hold the tape against return movement, and means effective after the carriage is returned for severing the advanced section of the tape.

3. In a ticket issuing apparatus, a typewriter carriage reciprocable across a printing position, a ticket tape holder secured to the carriage for supporting a tape, a clamping device for securing the tape to the carriage for movement therewith, whereby the tape advances with the carriage during typing operations, a stationary clamping device, automatic carriage return mechanism, means controlled by the carriage when it has advanced to a predetermined position for causing operation of said carriage return mechanism, for causing said first clamping device to release the tape and for causing said stationary clamping device to hold the tape against return movement, a severing device secured to the carriage for movement therewith, whereby during the return movement the severing device will traverse the advanced section of the tape, and means effective after the carriage is returned for operating said severing device to sever the advanced section of the tape.

4. The invention set forth in claim 3 in which a classification key is provided, and means controlled by said key for preventing operation of said severing device.

5. In a ticket issuing apparatus, a typewriter carriage having a platen, means for advancing the carriage in typing direction, means for returning the carriage, means for supporting a ticket tape in typing relationship with the platen, means for causing the tape to advance with the carriage in typing direction, means for holding the tape against return with the carriage, whereby successive advances and returns of the carriage will advance a plurality of tape sections, a severing device operable to sever a tape section after each carriage return operation, classification keys, and means controlled thereby to selectively render the severing device effective after one or after more than one return operation.

6. In a ticket issuing machine in which a transmitter electrically controls a typewriter having a movable carriage, said transmitter including a pocket to receive a record card containing designations representative of a destination and a plurality of fares, and also including a keyboard having keys to set up supplemental data, sensing devices in the transmitter to sense the record card for designations, means controlled by one of said keys for bringing the sensing devices into sensing coaction with the card, means controlled by said sensing devices for causing the typewriter to type the destination and fare represented on the card in successive order, means controlled jointly by said key and the typewriter carriage for causing the typewriter to type the related supplemental data when the carriage is in a predetermined position, means controlled by another of said keys for causing the typewriter to type further supplemental data, said means being normally ineffective, and means controlled by the typewriter carriage when it is in another predetermined position for rendering the last named means effective to cause the typewriter to type said further supplemental data.

7. In a ticket issuing apparatus, a typewriter carriage reciprocable across a printing position, a ticket tape holder secured to the carriage for supporting a tape, a clamping device for securing the tape to the carriage for movement therewith, whereby the tape advances with the carriage during typing operations, a stationary clamping device, automatic carriage return mechanism, means controlled by the carriage when it has advanced to a predetermined position for causing operation of said carriage return mechanism, for causing said first clamping device to release the tape and for causing said stationary clamping device to hold the tape against return movement, a date stamping device secured to the carriage for movement therewith, whereby during the return movement the stamping device will traverse the advanced section of the tape, and means effective after the carriage is returned for operating said stamping device to date the advanced section of the tape.

8. In a ticket issuing apparatus, a typewriter carriage reciprocable across a printing position, a ticket tape holder secured to the carriage for supporting a tape, a clamping device for securing the tape to the carriage for movement therewith, whereby the tape advances with the carriage during typing operations, a stationary clamping device, automatic carriage return mechanism, means controlled by the carriage when it has advanced to a predetermined position for causing operation of said carriage return mechanism, for causing said first clamping device to release the tape and for causing said stationary clamping device to hold the tape against return movement, a date stamping device and a severing device secured to the carriage for movement therewith, whereby during the return movement the said devices will traverse the advanced section of the tape, and means effective after the carriage is returned for concurrently operating both the date stamping and severing devices to date and sever the advanced section of the tape.

ALBERT W. MILLS.
FRANK J. FURMAN.

REFERENCES CITED

The following references are of record in the file of this patent:

UNITED STATES PATENTS

| Number | Name | Date |
|---|---|---|
| 1,519,954 | Reynolds | Dec. 9, 1924 |
| 2,224,771 | Mills | Dec. 10, 1940 |
| 2,297,789 | Mills et al. | Oct. 6, 1942 |